(12) United States Patent
Song et al.

(10) Patent No.: US 11,500,192 B2
(45) Date of Patent: Nov. 15, 2022

(54) LENS CURVATURE VARIATION APPARATUS

(71) Applicant: LG INNOTEK CO., LTD., Seoul (KR)

(72) Inventors: Seungheun Song, Seoul (KR); Sungoh Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/964,436

(22) PCT Filed: Jul. 20, 2018

(86) PCT No.: PCT/KR2018/008213
§ 371 (c)(1),
(2) Date: Jul. 23, 2020

(87) PCT Pub. No.: WO2019/146855
PCT Pub. Date: Aug. 1, 2019

(65) Prior Publication Data
US 2021/0048661 A1 Feb. 18, 2021

(30) Foreign Application Priority Data

Jan. 23, 2018 (KR) .......................... 10-2018-0008045

(51) Int. Cl.
*G02B 3/12* (2006.01)
*G02B 26/00* (2006.01)
*G02B 3/14* (2006.01)

(52) U.S. Cl.
CPC ............. *G02B 26/004* (2013.01); *G02B 3/14* (2013.01)

(58) Field of Classification Search
CPC ...... G02B 26/004; G02B 3/14; G02B 26/005; G02B 3/12
See application file for complete search history.

(56) References Cited

U.S. PATENT DOCUMENTS

| 4,786,849 A | 11/1988 | Tateishi |
| 2002/0176148 A1 | 11/2002 | Onuki et al. |

(Continued)

FOREIGN PATENT DOCUMENTS

| CN | 1938610 A | 3/2007 |
| CN | 1947036 A | 4/2007 |

(Continued)

OTHER PUBLICATIONS

International Search Report dated Oct. 29, 2018 in International Application No. PCT/KR2018/008213.

(Continued)

*Primary Examiner* — Joseph P Martinez
(74) *Attorney, Agent, or Firm* — Saliwanchik, Lloyd & Eisenschenk

(57) ABSTRACT

The present invention relates to a lens curvature variation apparatus. The lens curvature variation apparatus according to an embodiment is a lens curvature variation apparatus for varying a curvature of a liquid lens which is variable based on an applied electrical signal. The lens curvature variation apparatus includes a lens driver to apply the electrical signal to the liquid lens, a sensor unit to sense the curvature of the liquid lens formed based on the electrical signal, and a controller to control the lens driver to form a target curvature of the liquid lens based on the sensed curvature, wherein the lens driver supplies the electrical signal to the liquid lens according to a switching operation of a switching element, and includes a detection element connected to one end of the switching element, wherein the sensor unit senses an electrical signal detected by the detection element. Thereby, the curvature of the lens can be sensed quickly and accurately.

15 Claims, 25 Drawing Sheets

(56) References Cited

U.S. PATENT DOCUMENTS

| | | |
|---|---|---|
| 2005/0041301 A1 | 2/2005 | Kibayashi |
| 2007/0156021 A1 | 7/2007 | Morse et al. |
| 2007/0273978 A1 | 11/2007 | Hendriks et al. |
| 2008/0062529 A1 | 3/2008 | Helwegen et al. |
| 2008/0239450 A1 | 10/2008 | Immink et al. |
| 2009/0153208 A1 | 6/2009 | Lynch |
| 2009/0185280 A1* | 7/2009 | Helwegen ............... G02B 3/14 359/666 |
| 2010/0014167 A1* | 1/2010 | Immink .................. G02B 3/14 359/666 |
| 2011/0211262 A1 | 9/2011 | Craen et al. |
| 2016/0097929 A1 | 4/2016 | Yee et al. |

FOREIGN PATENT DOCUMENTS

| | | |
|---|---|---|
| CN | 201196697 Y | 2/2009 |
| JP | 63-78386 A | 4/1988 |
| JP | 11-201717 A | 7/1999 |
| JP | 2006-227036 A | 8/2006 |
| JP | 2007-531048 A | 11/2007 |
| KR | 10-2017-0065631 A | 6/2017 |

OTHER PUBLICATIONS

Supplementary European Search Report dated Aug. 31, 2021 in European Application No. 18902228.8.

Office Action dated Oct. 26, 2021 in Chinese Application No. 201880091628.3.

Office Action dated Aug. 2, 2022 in Japanese Application No. 2020-540574.

Office Action dated Sep. 26, 2022 in Korean Application No. 10-2018-0008045.

* cited by examiner

[Fig. 1a]
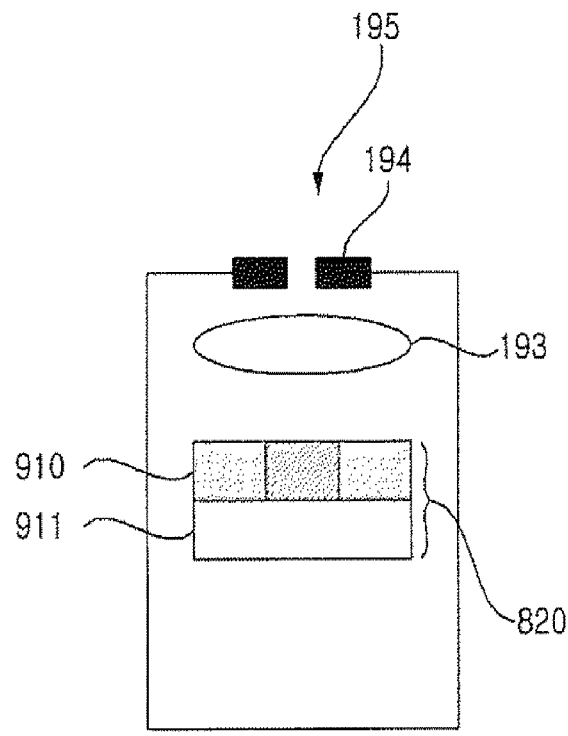
[Fig. 1b]
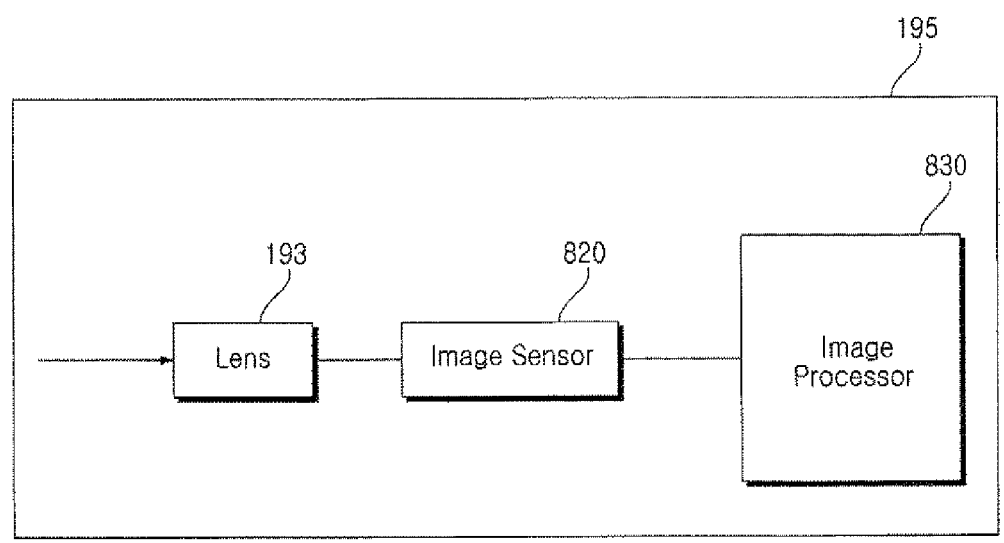

[Fig. 2]
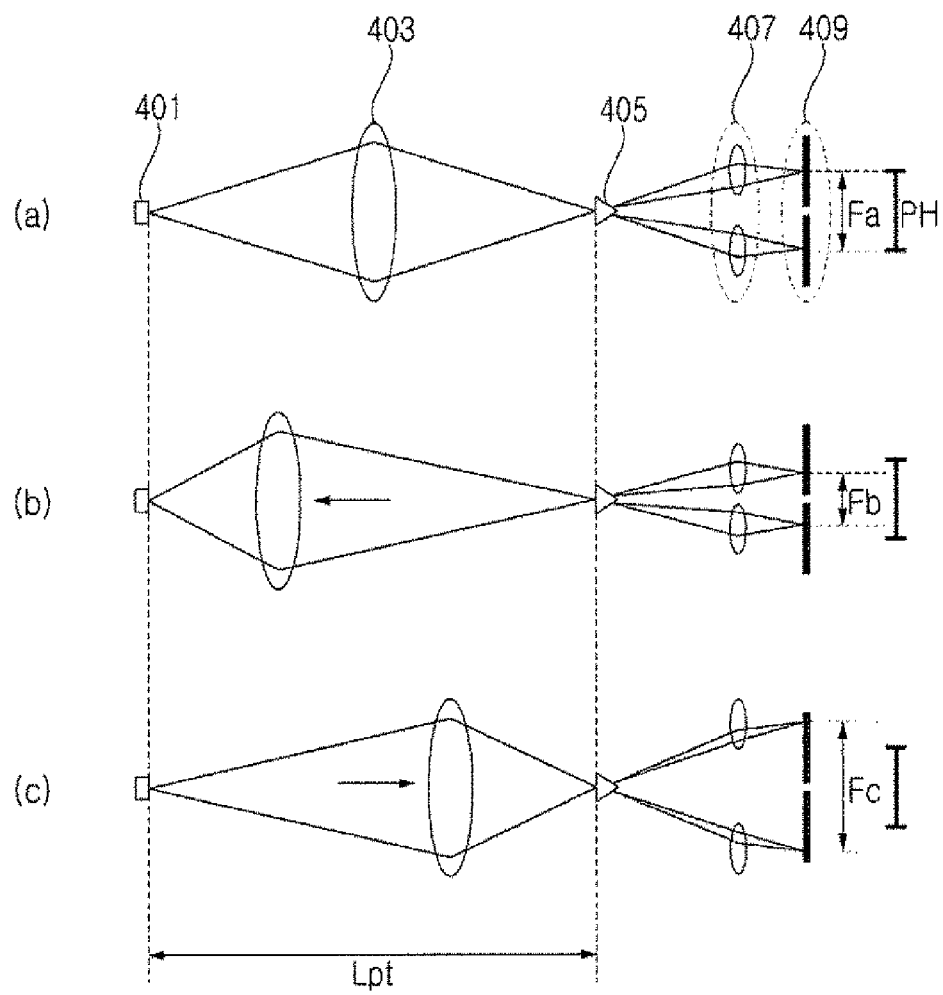

[Fig. 3a]
(a)
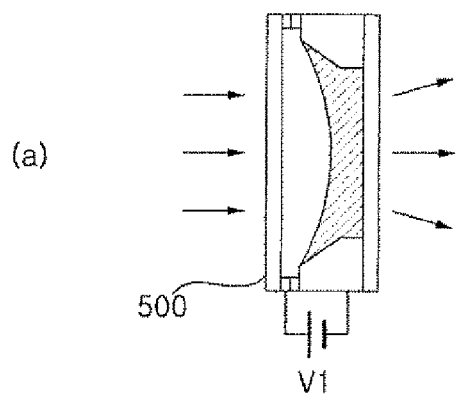
(b)
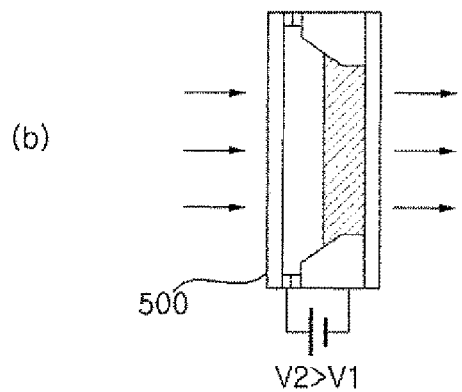
(c)
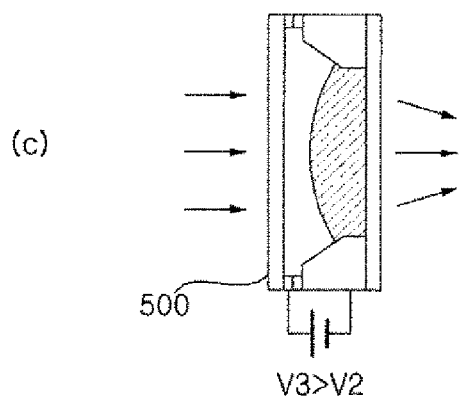

[Fig. 3b]
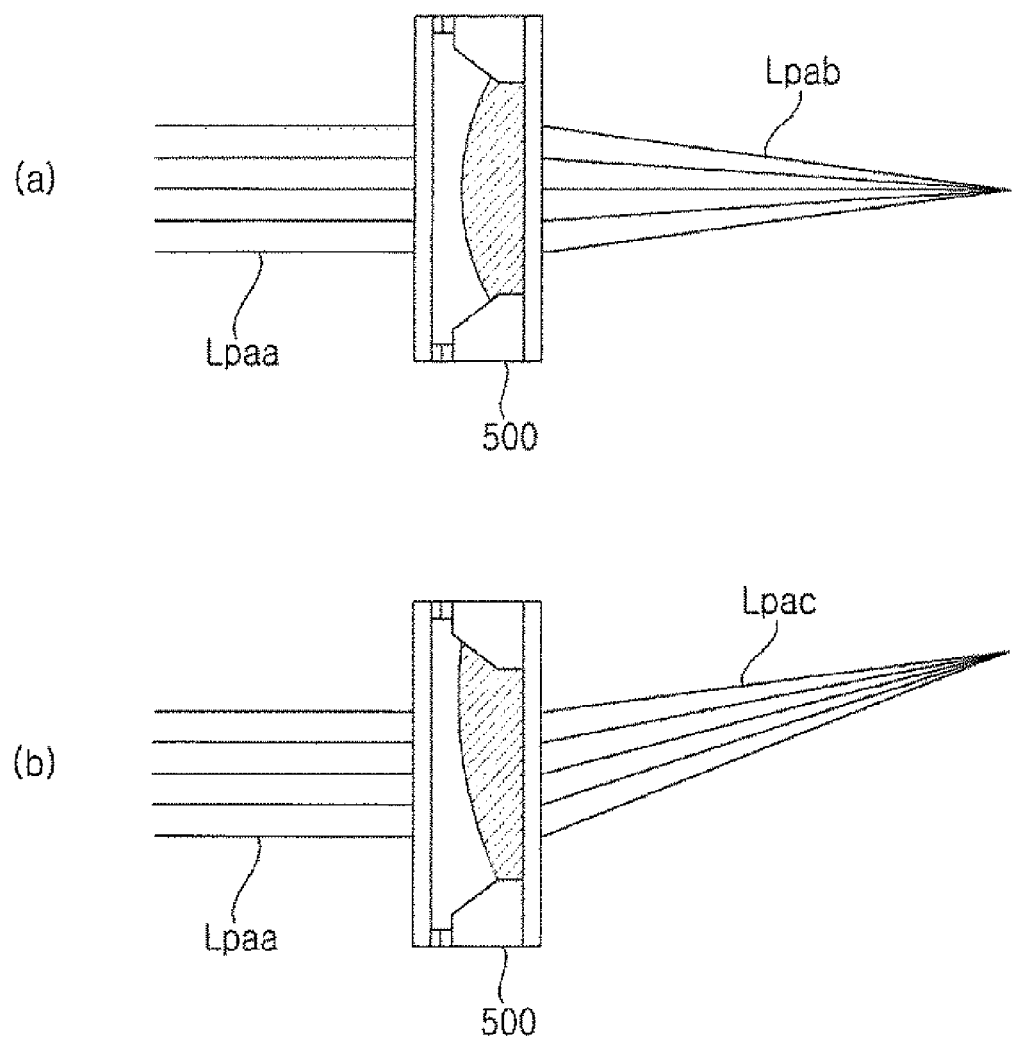

[Fig. 4a]
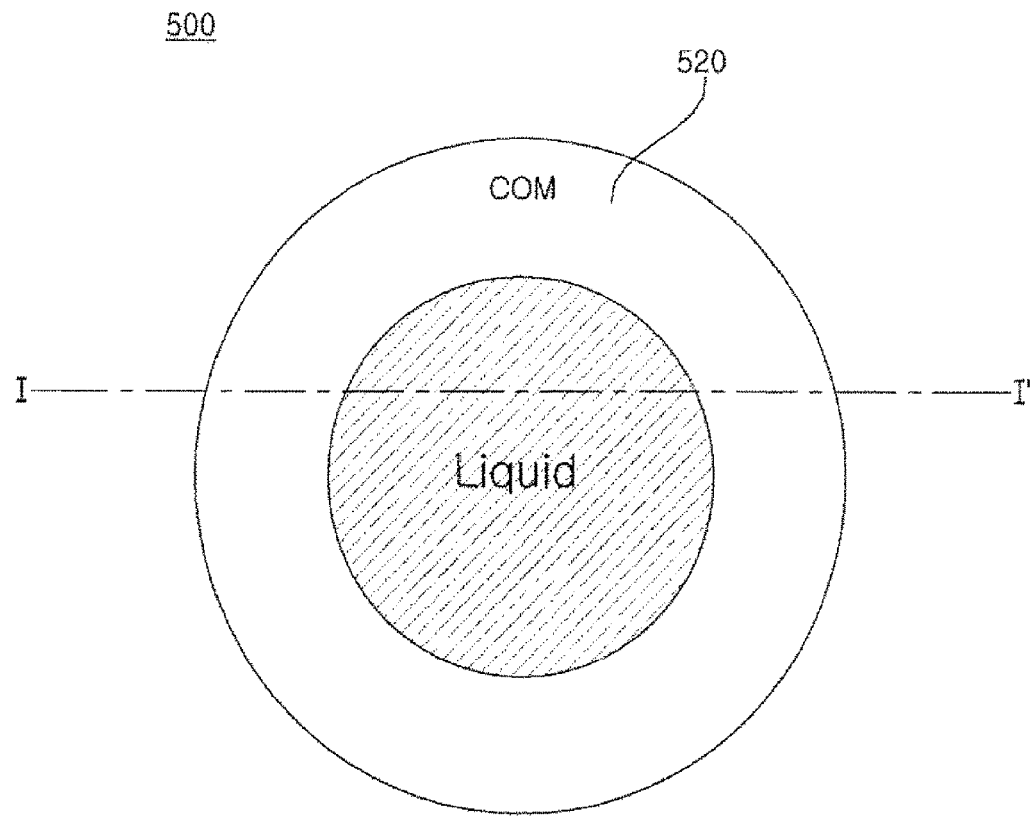
[Fig. 4b]
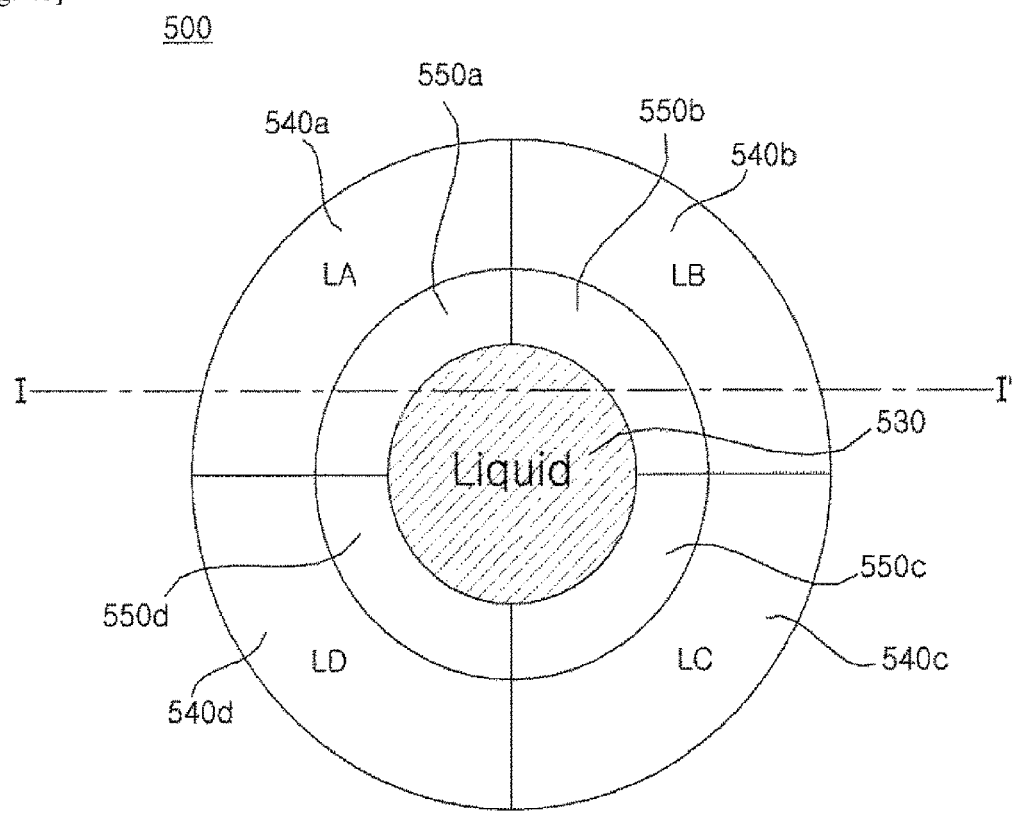

[Fig. 4c]
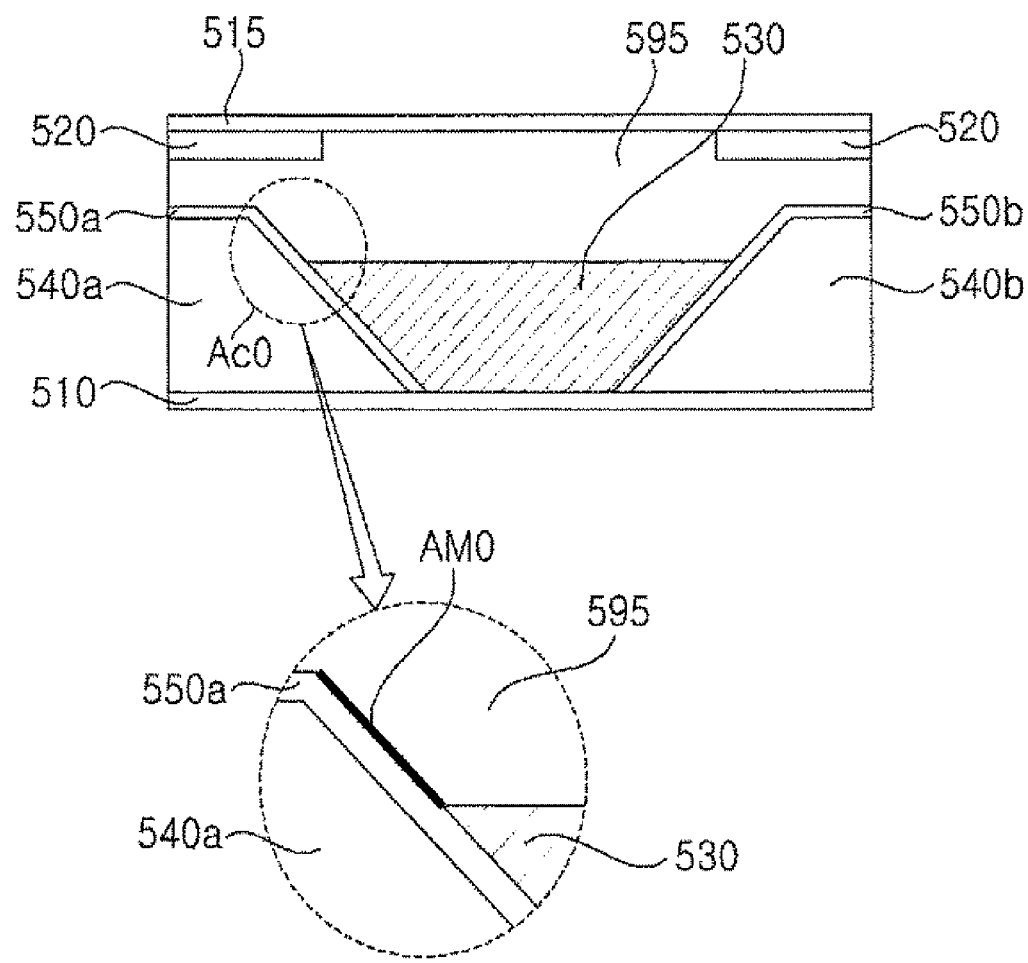

[Fig. 5a]
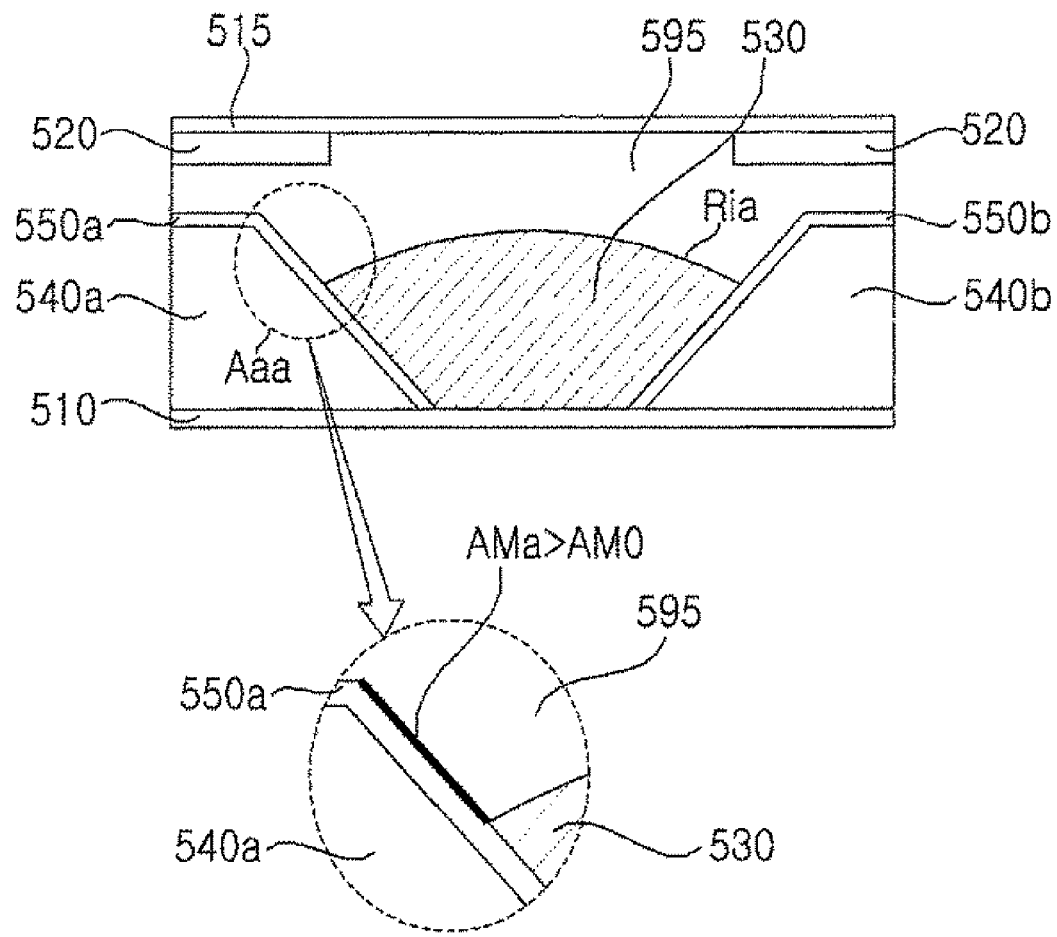

[Fig. 5b]
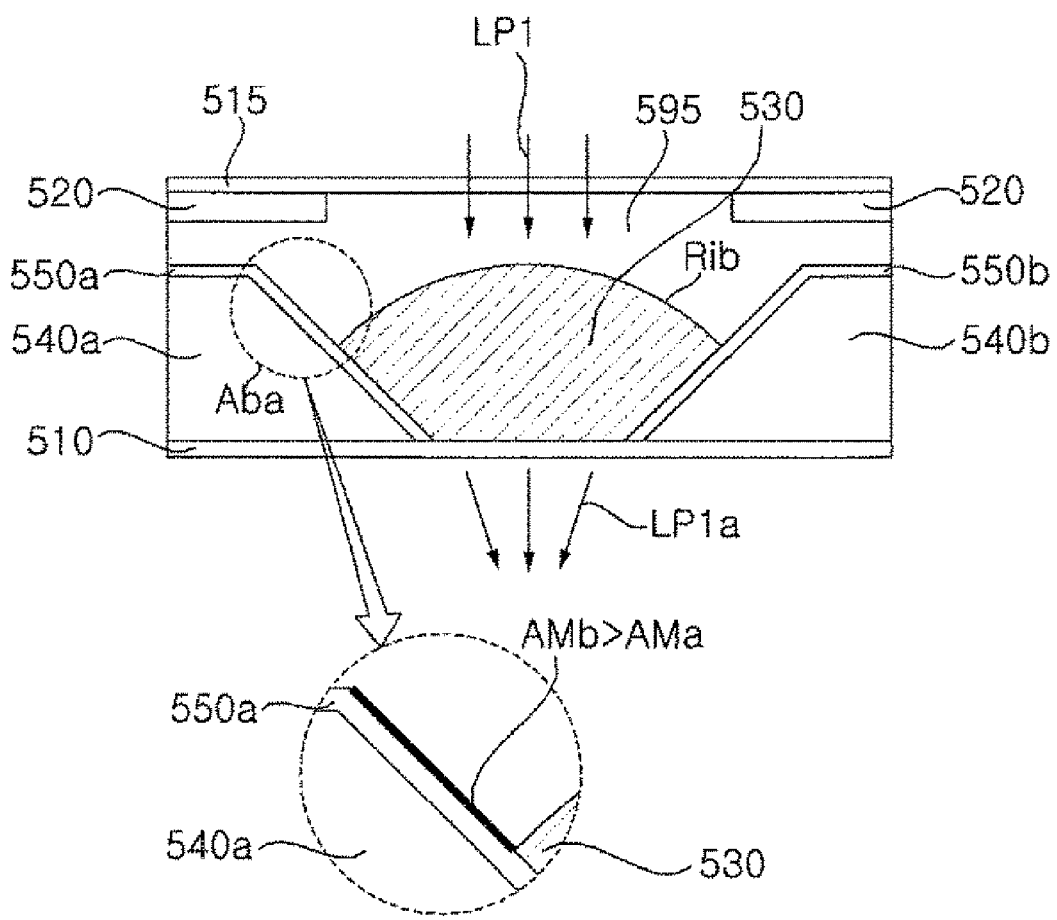

[Fig. 5c]
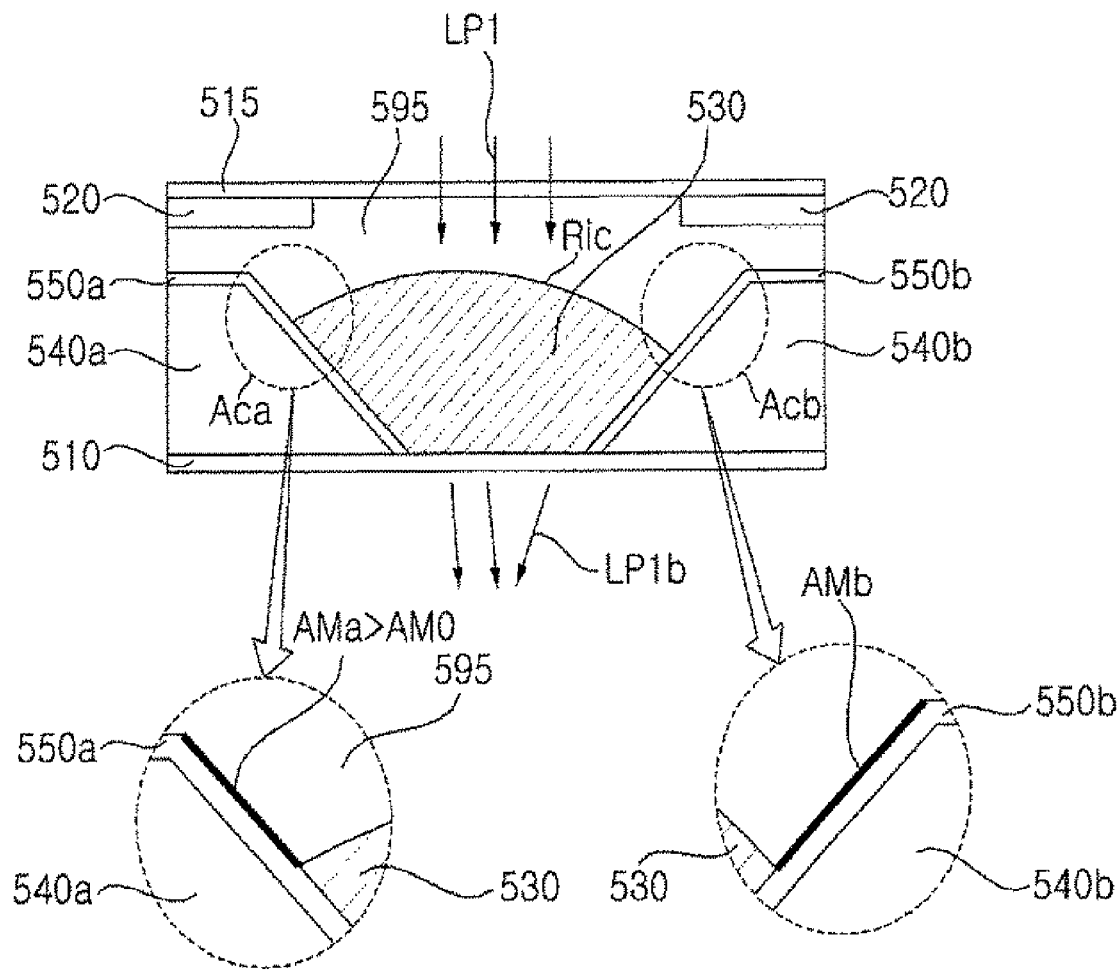

[Fig. 5d]
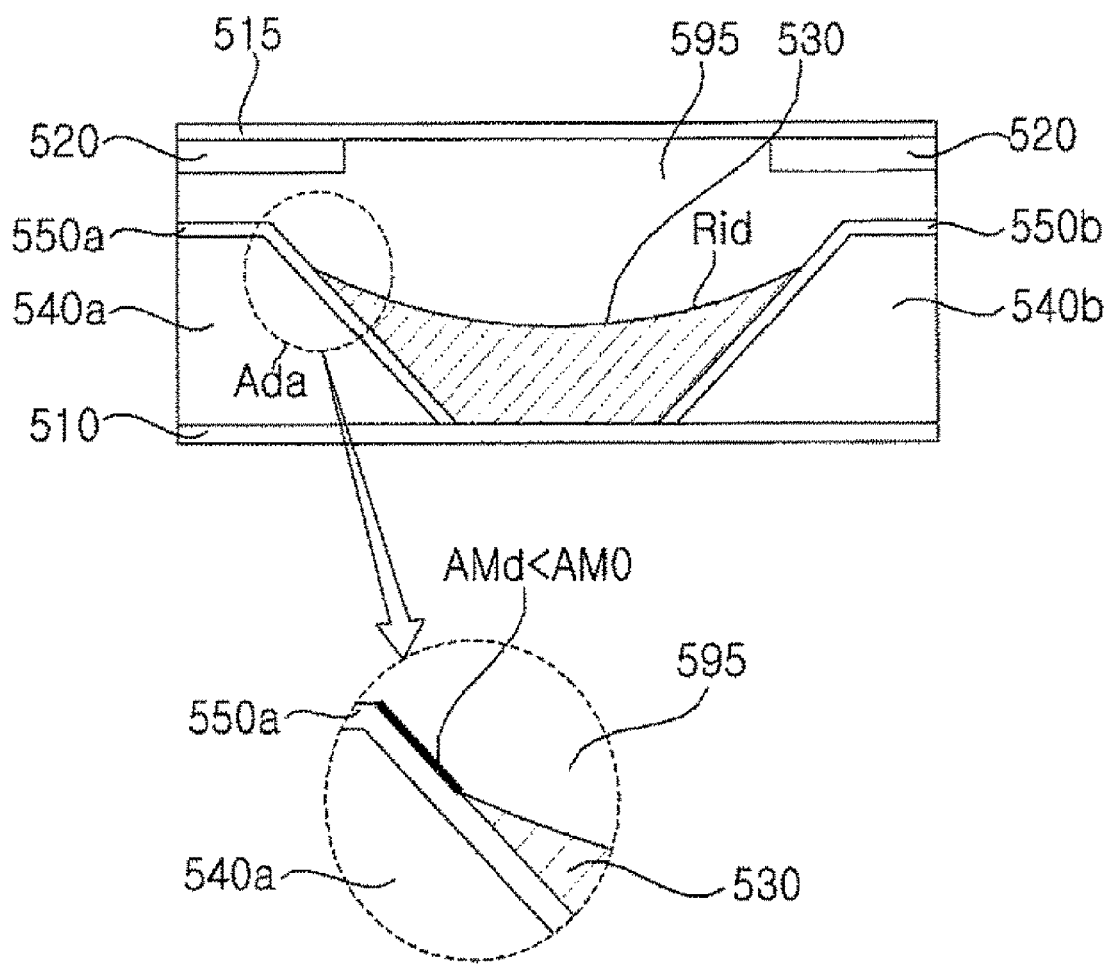

[Fig. 5e]
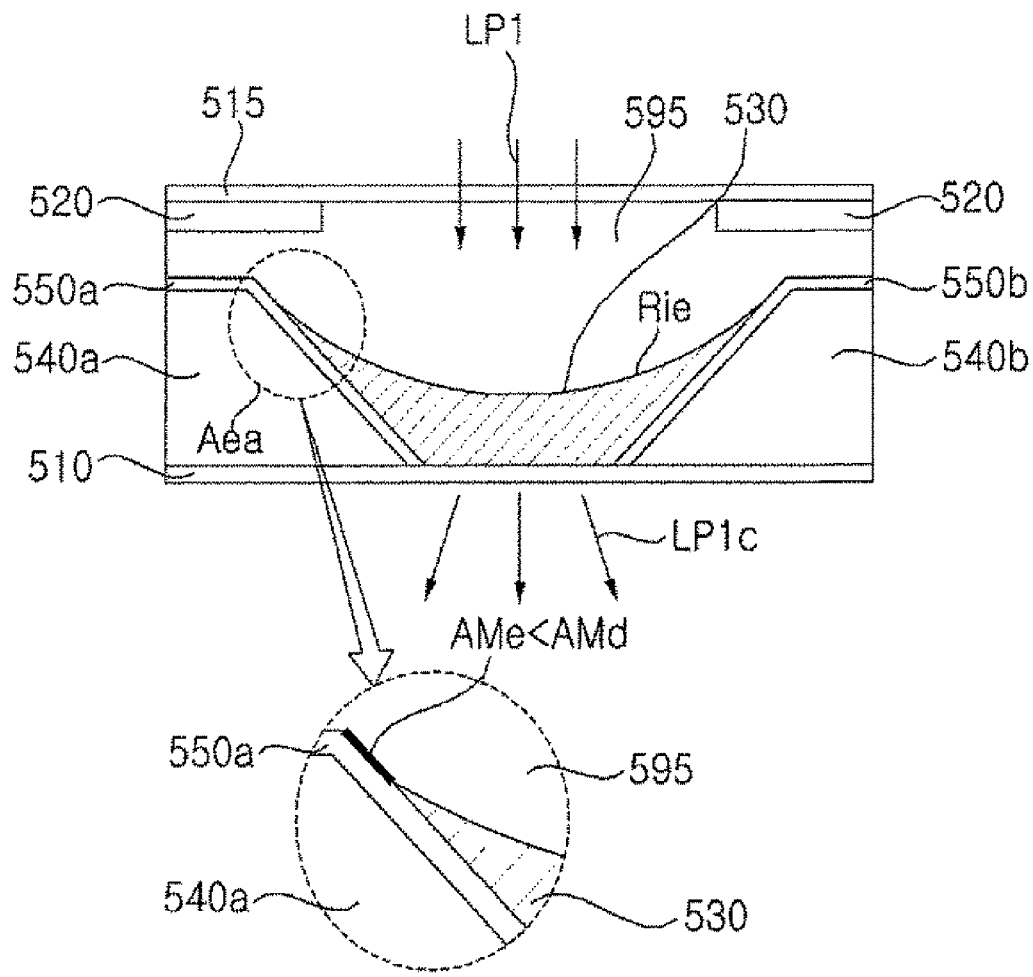

[Fig. 6]
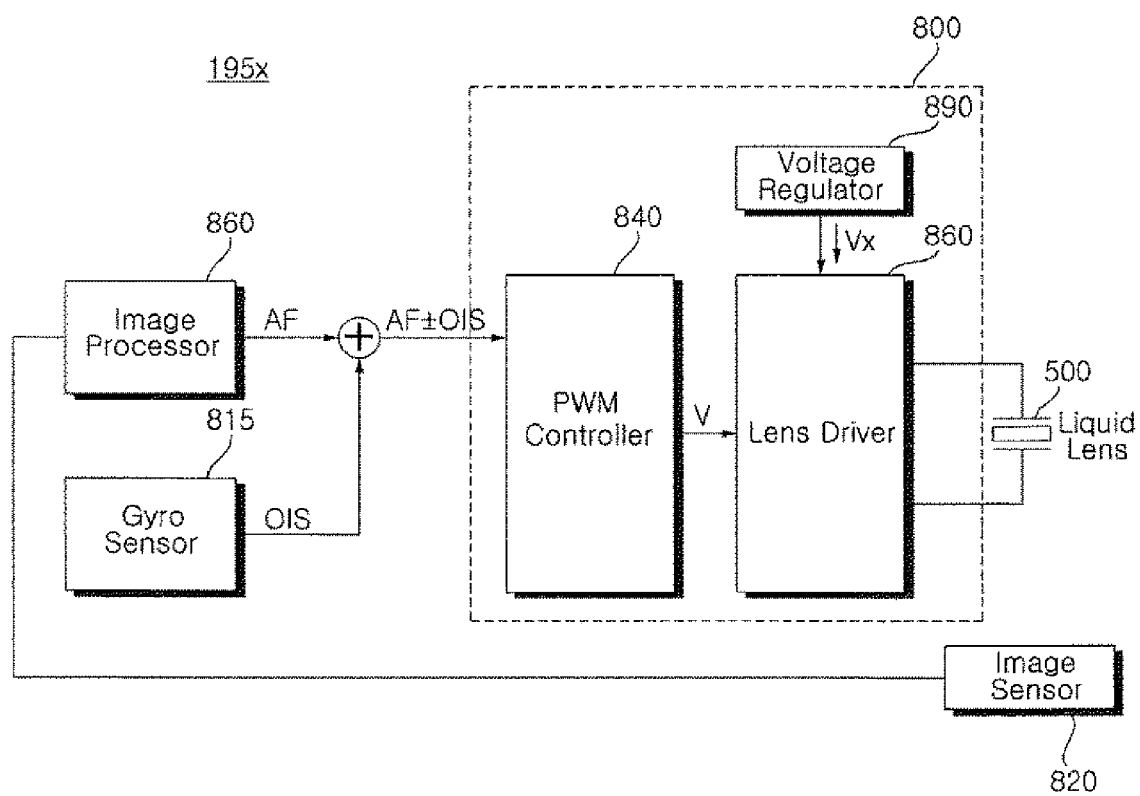

[Fig. 7]
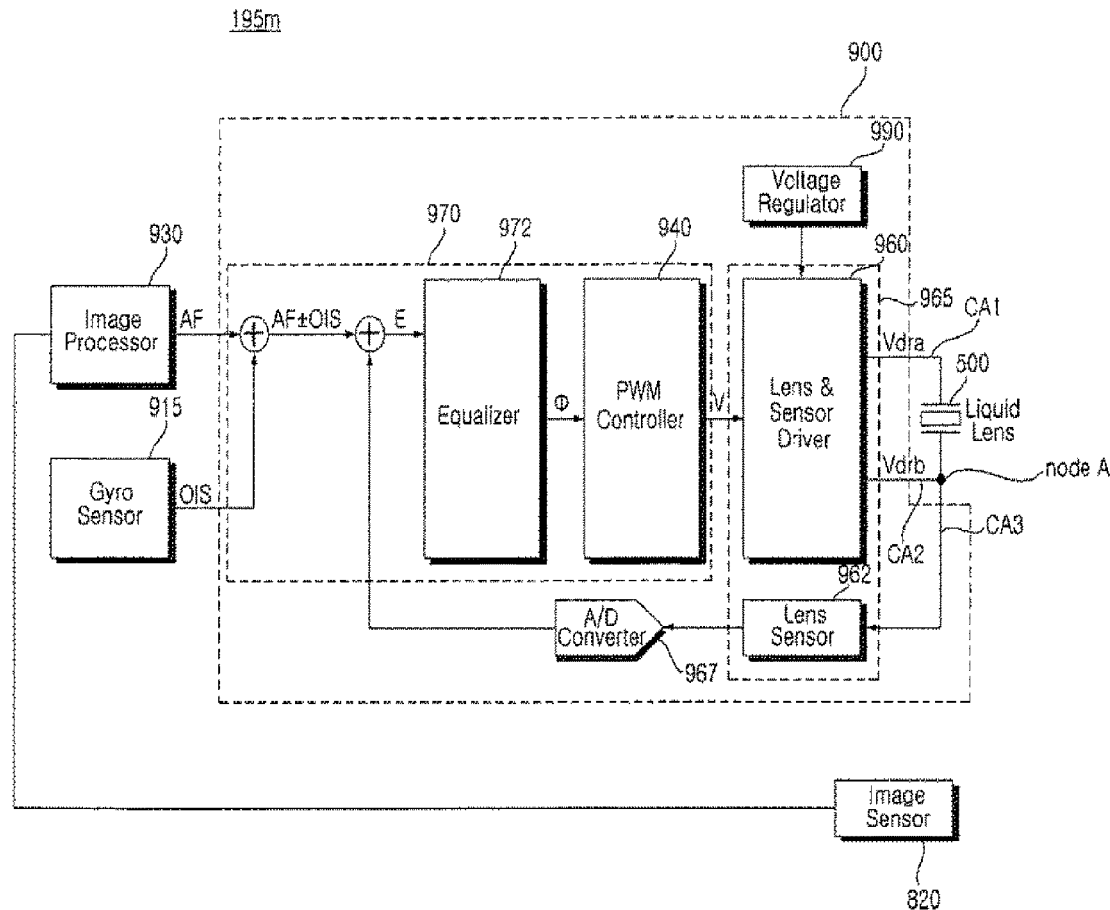
[Fig. 8]
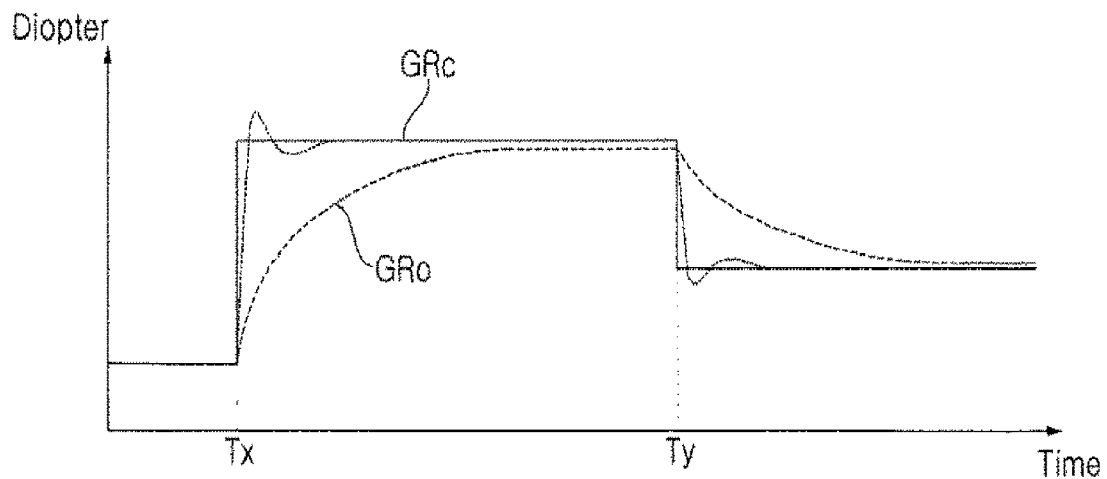

[Fig. 9a]
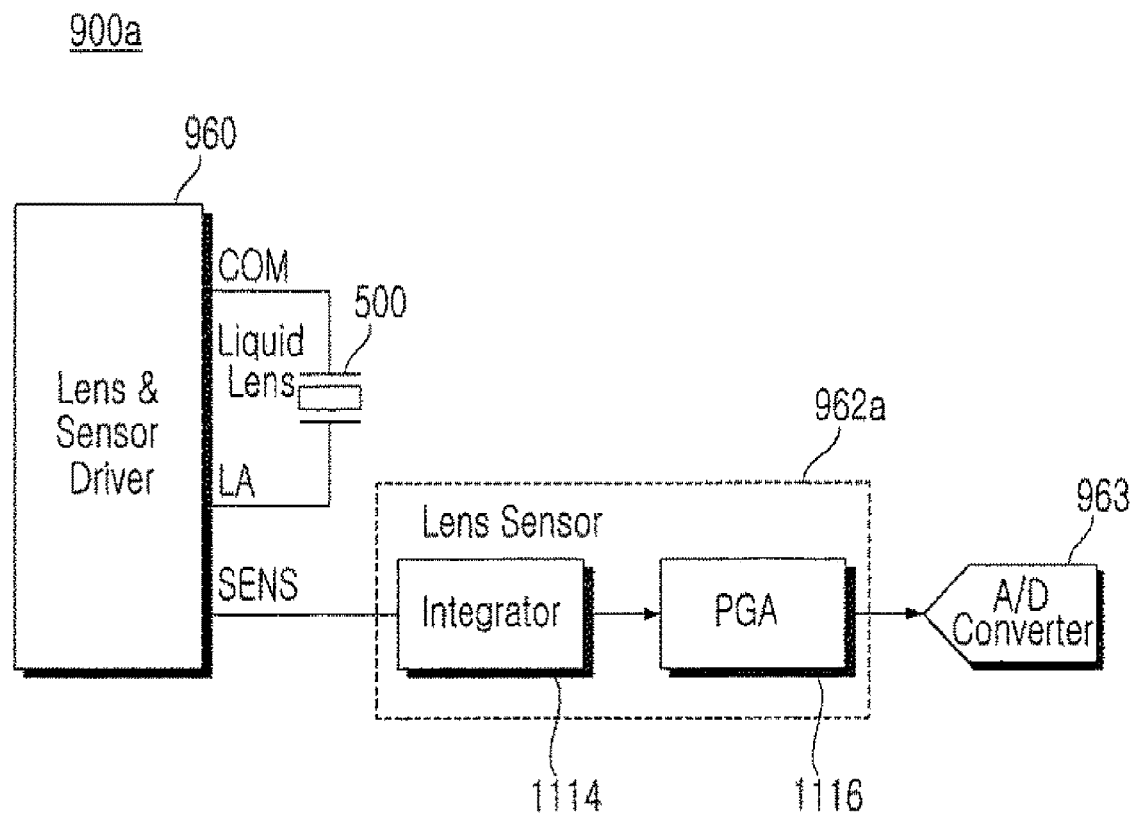
[Fig. 9b]
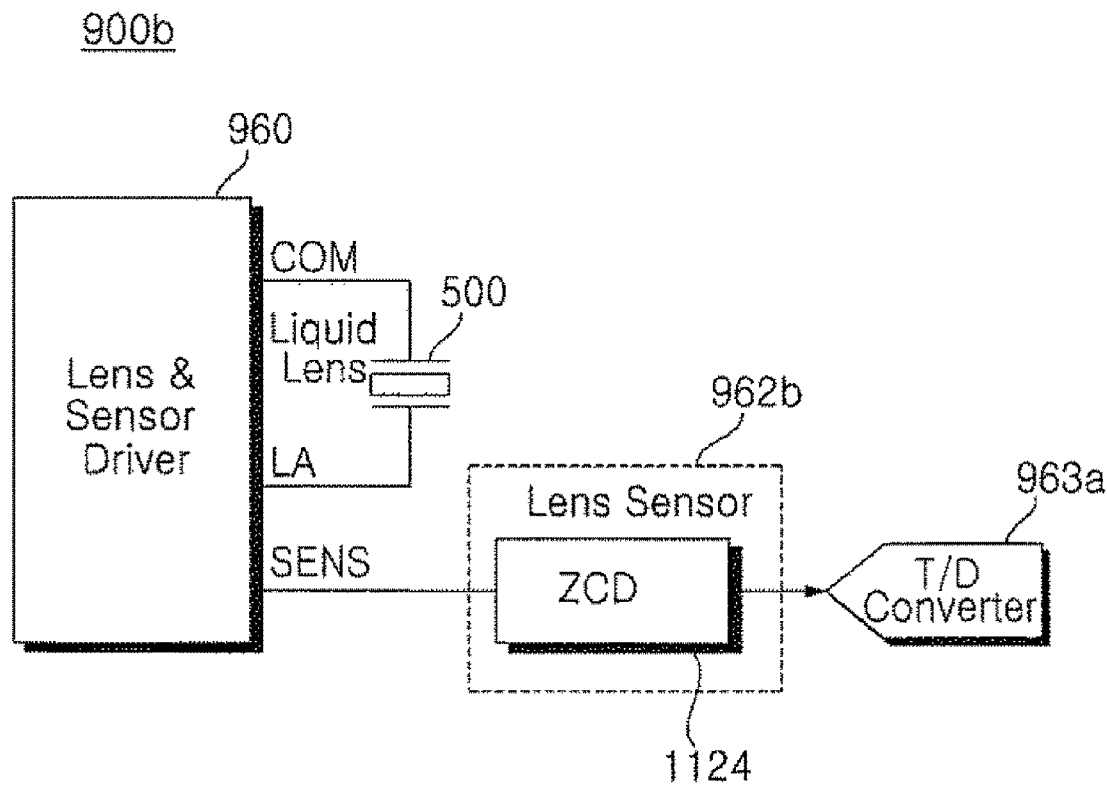

[Fig. 10a]
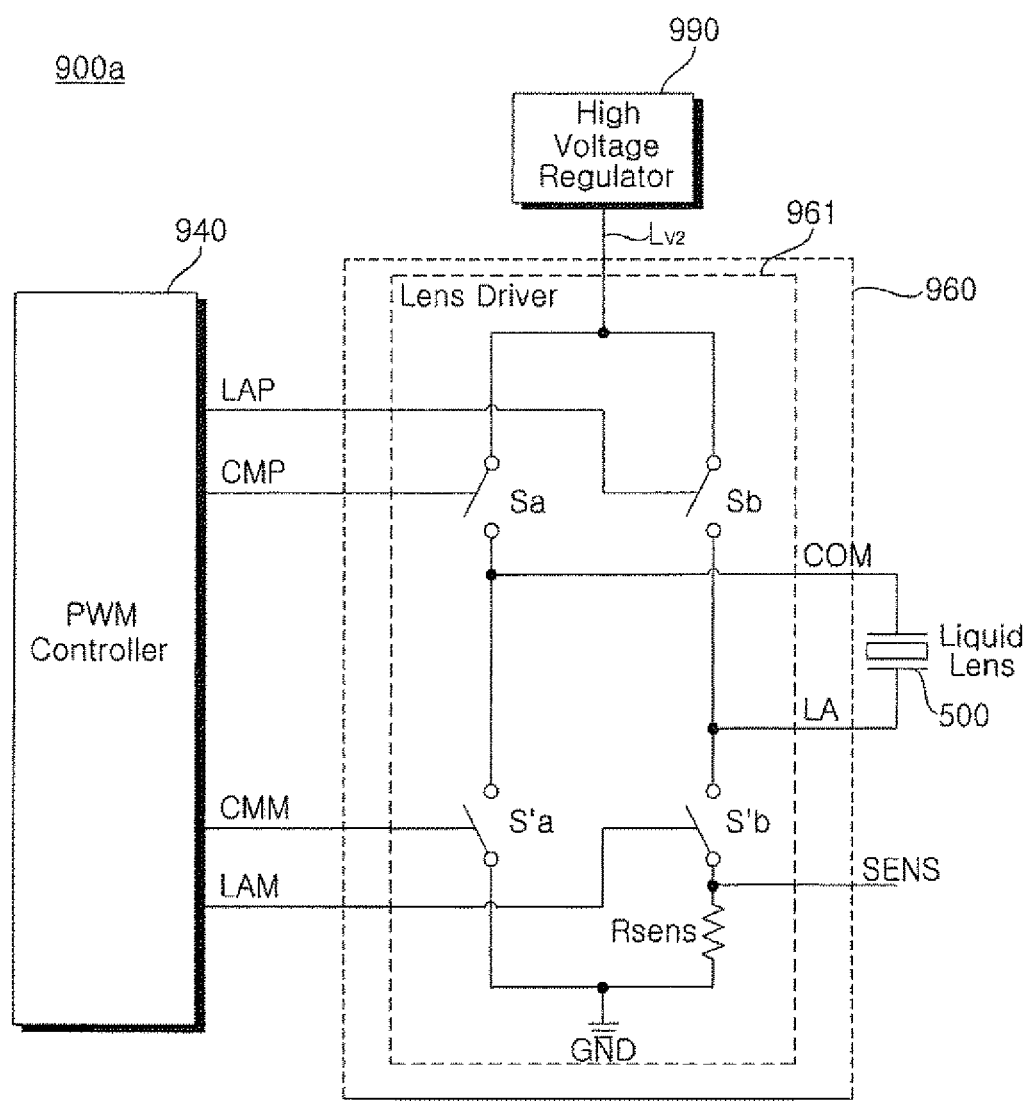

[Fig. 10b]
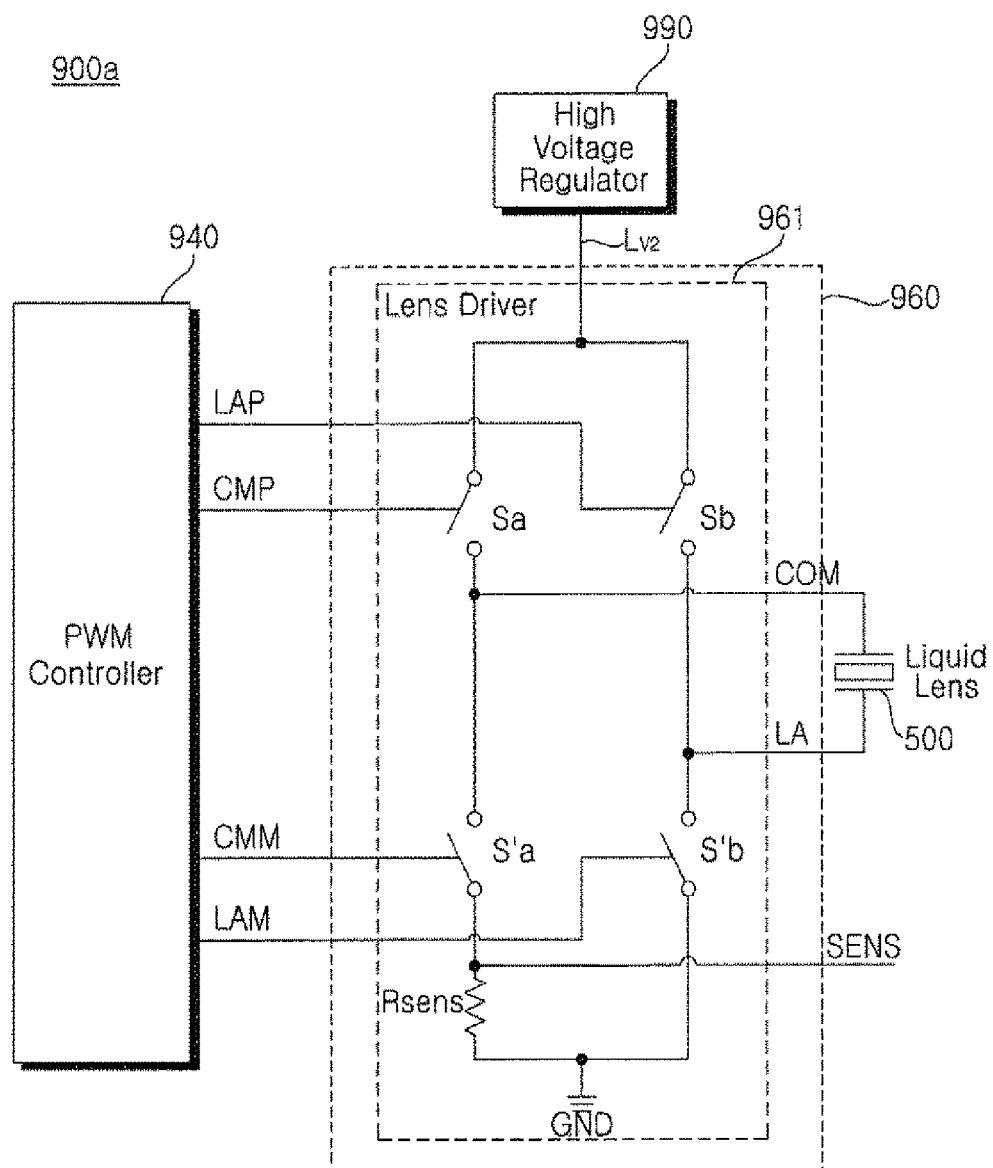

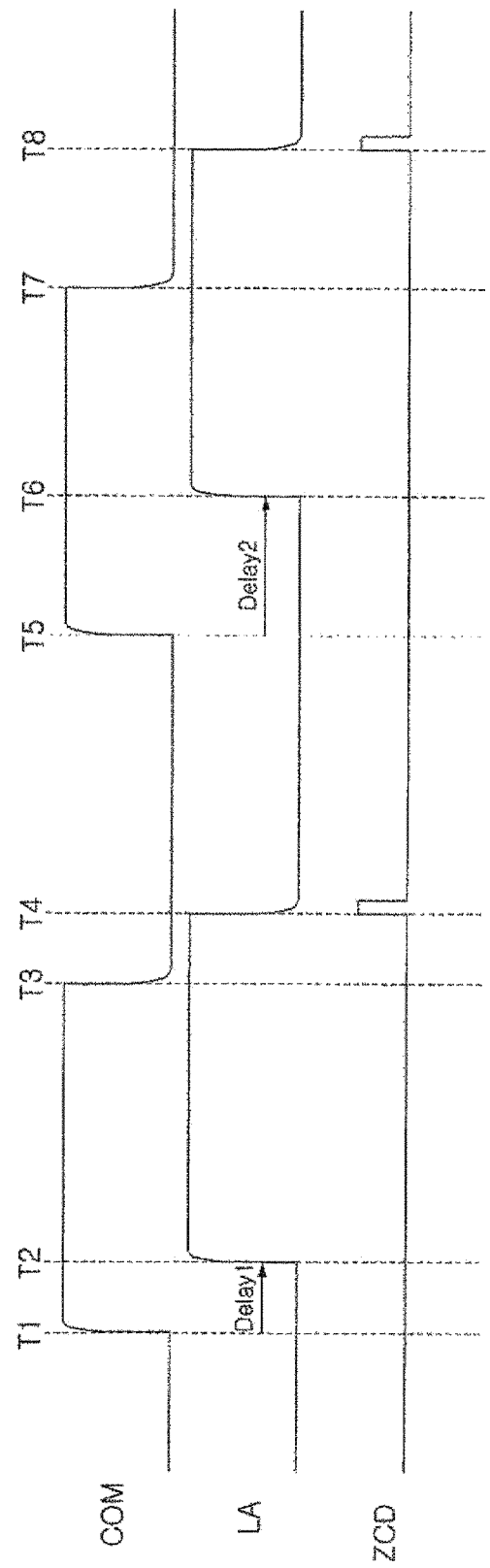

[Fig. 12a]
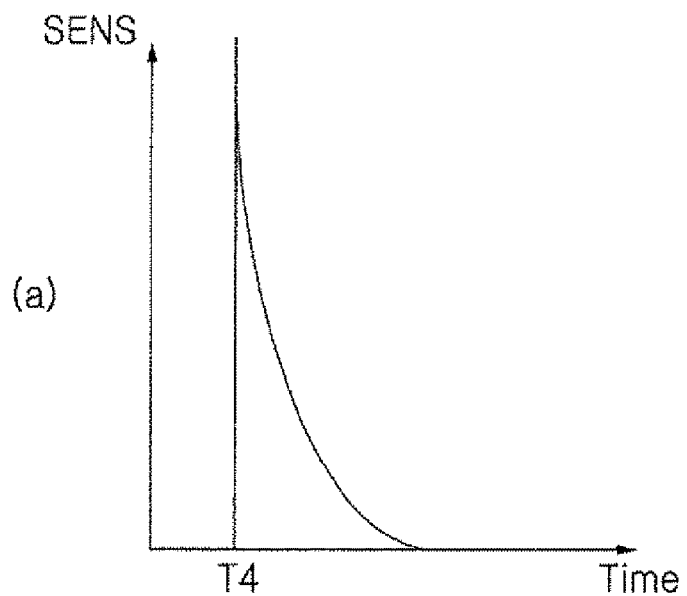
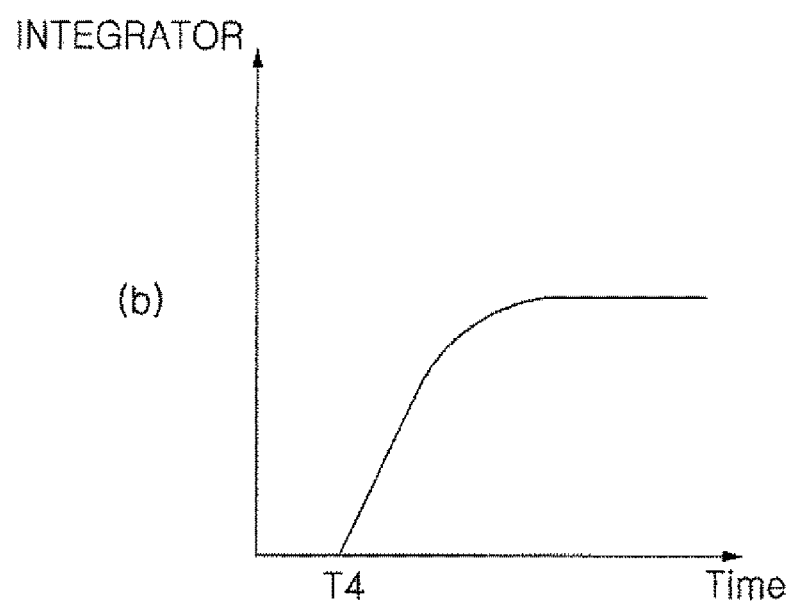

[Fig. 12b]
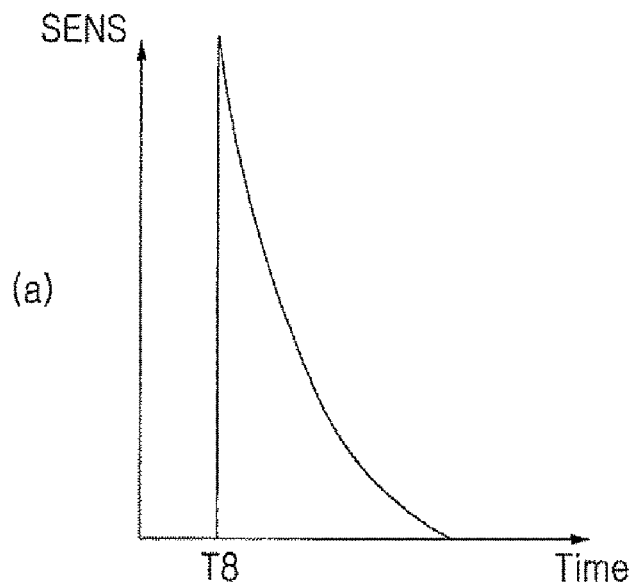
(a)
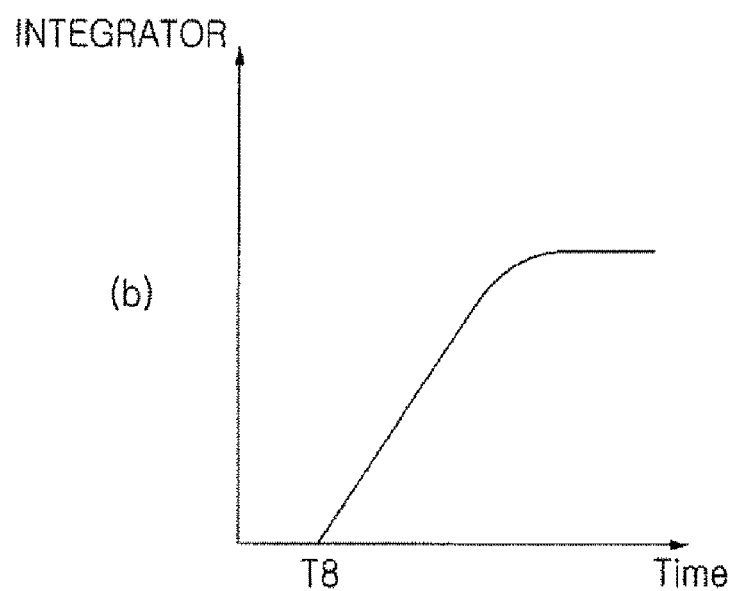
(b)

[Fig. 13a]
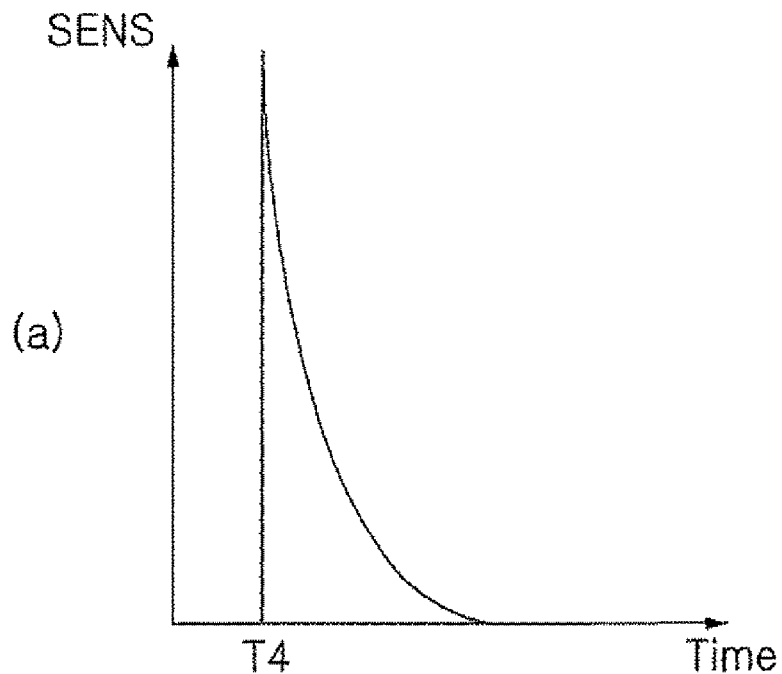
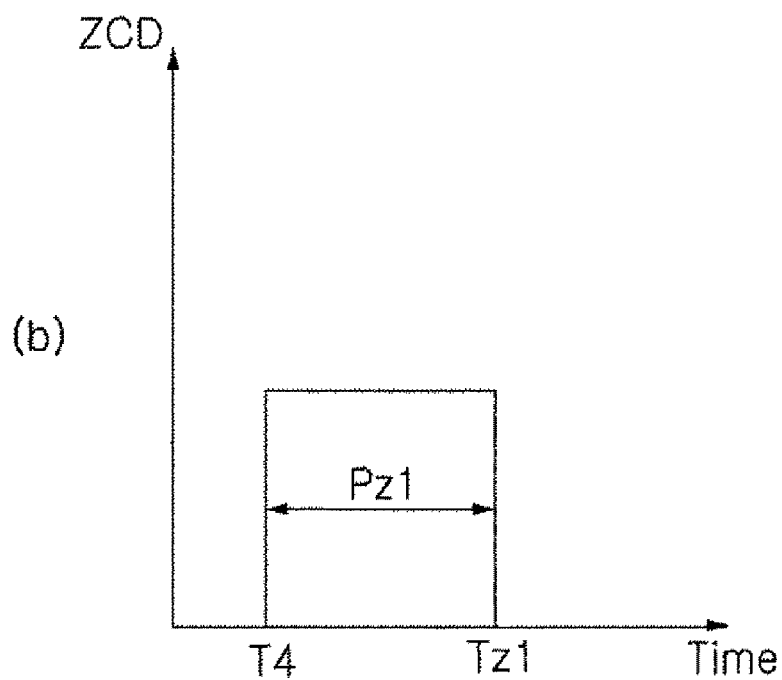

[Fig. 13b]
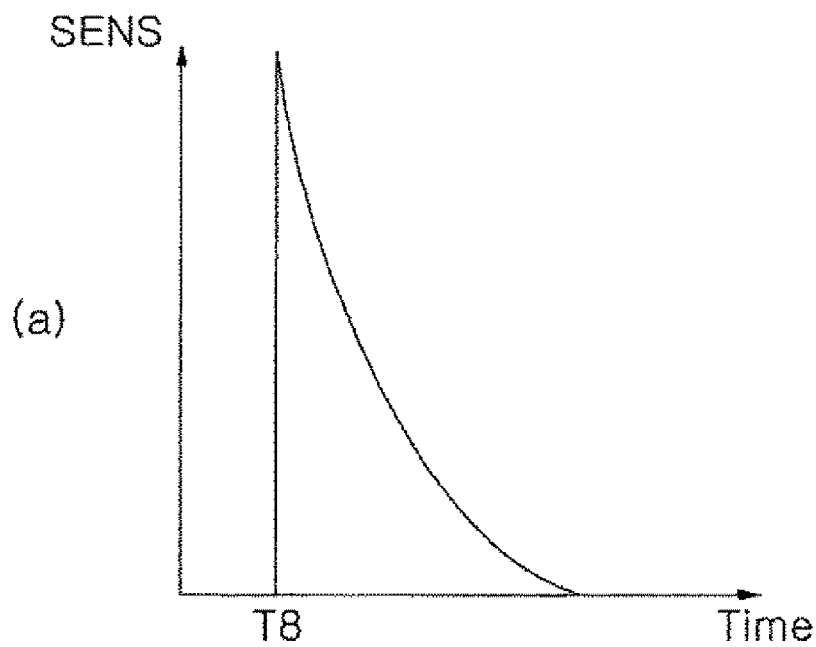
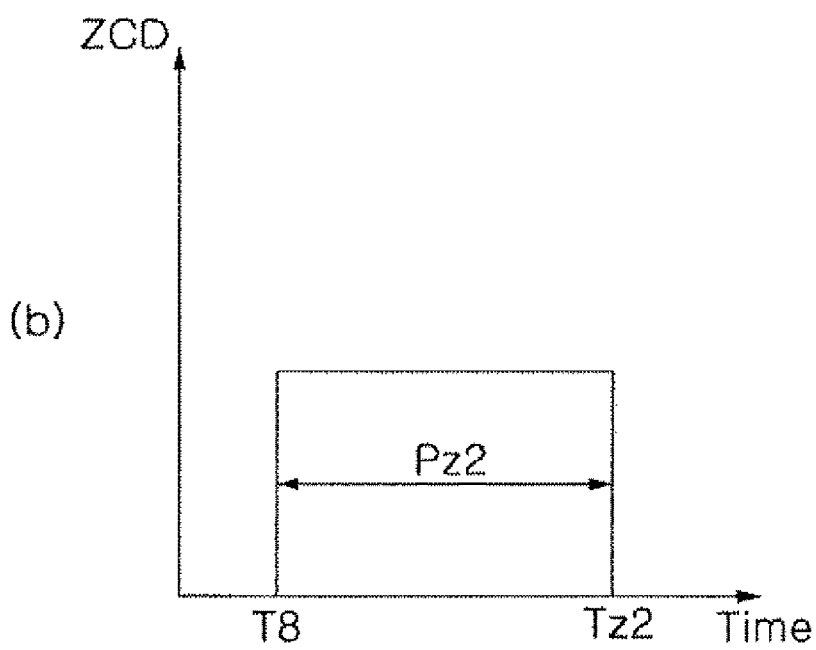

[Fig. 14]
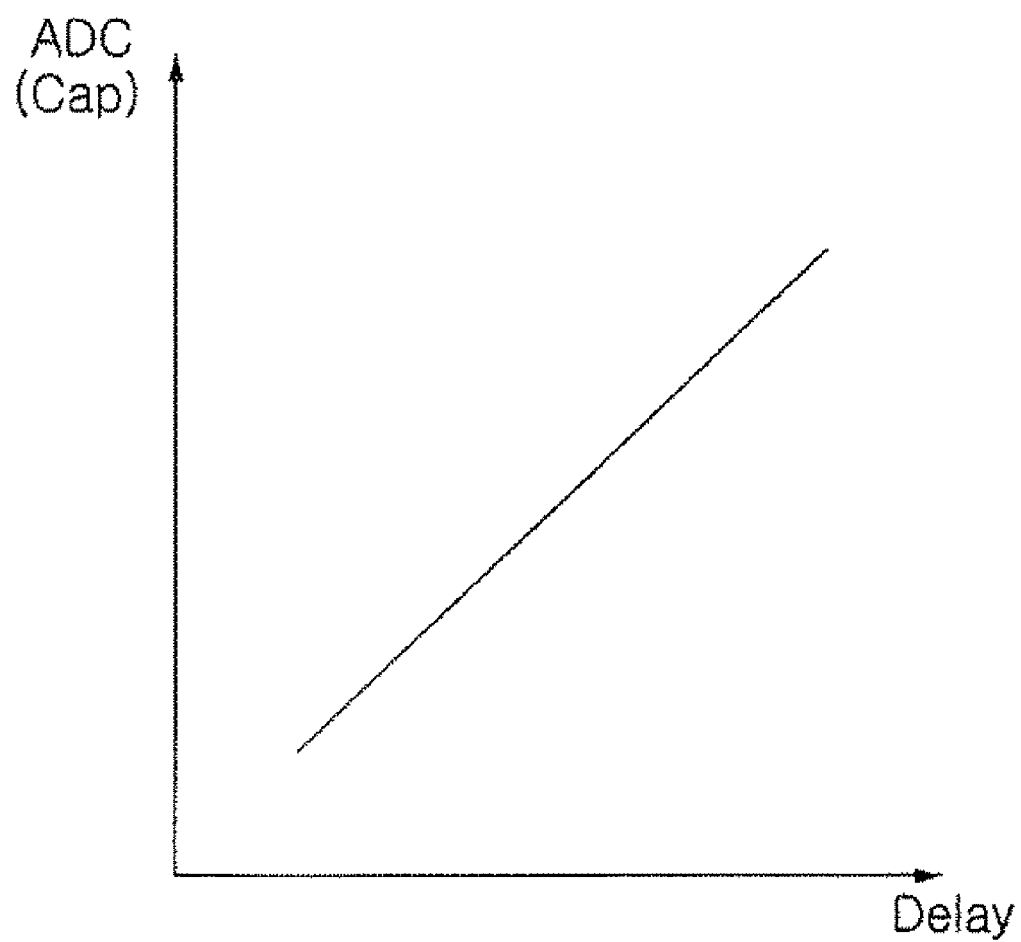

LENS CURVATURE VARIATION APPARATUS

CROSS-REFERENCE TO RELATED APPLICATIONS

This application is the U.S. national stage application of International Patent Application No. PCT/KR2018/008213, filed Jul. 20, 2018, which claims the benefit under 35 U.S.C. § 119 of Korean Patent Application No. 10-2018-0008045, filed Jan. 23, 2018, the disclosures of each of which are incorporated herein by reference in their entirety.

TECHNICAL FIELD

The present invention relates to a lens curvature variation apparatus, and more particularly, to a lens curvature variation apparatus capable of quickly and accurately sensing the curvature of a lens.

BACKGROUND ART s are used in a variety of electronic devices, especially in cameras.

Light passing through a lens in a camera is converted into an electrical signal through an image sensor, and an image can be acquired based on the electrical signal obtained through conversion.

In order to adjust the focus of an image to capture, it is necessary to vary the position of the lens. However, when the camera is employed in a small electronic device, a considerable space needs to be secured to vary the position of the lens, which results in inconvenience.

Accordingly, an approach for adjusting the focus of an image to capture without varying the position of the lens is being studied.

DISCLOSURE OF INVENTION

Technical Problem

Therefore, the present invention has been made in view of the above problems, and it is an object of the present invention to provide a lens curvature variation apparatus capable of quickly and accurately sensing the curvature of a lens curvature variation apparatus.

It is another object of the present invention to provide a lens curvature variation apparatus capable of quickly and accurately varying the curvature of a lens curvature variation apparatus.

Solution to Problem

In accordance with an aspect of the present invention, the above and other objects can be accomplished by the provision of a lens curvature variation apparatus for varying a curvature of a liquid lens which is variable based on an applied electrical signal, the lens curvature variation apparatus including a lens driver to apply the electrical signal to the liquid lens, a sensor unit to sense the curvature of the liquid lens formed based on the electrical signal, and a controller to control the lens driver to form a target curvature of the liquid lens based on the sensed curvature, wherein the lens driver supplies the electrical signal to the liquid lens according to a switching operation of a switching element, and includes a detection element connected to one end of the switching element, wherein the sensor unit senses an electrical signal detected by the detection element.

Advantageous Effects of Invention

As is apparent from the above description, a lens curvature variation apparatus according to an embodiment of the present invention is configured to vary the curvature of a liquid lens which is variable based on an applied electrical signal, and includes a lens driver to apply an electrical signal to a liquid lens, a sensor unit to sense the curvature of the liquid lens formed based on the electrical signal, and a controller to control the lens driver to form a target curvature of the liquid lens based on the sensed curvature, wherein the lens driver supplies the electrical signal to the liquid lens according to a switching operation of a switching element, and includes a detection element connected to one end of the switching element, and the sensor unit senses the electrical signal detected by the detection element. Thereby, the curvature of the lens may be quickly and accurately sensed.

The lens driver includes a first upper switching element and a first lower switching element connected in series to each other, and a second upper switching element and a second lower switching element connected in parallel to the first upper and lower switching elements and connected in series to each other. The detection element is connected between a ground terminal and one of the first lower switching element and the second lower switching element. Accordingly, when the first lower switching element or the second lower switching element is turned on, the electrical signal detected by the detection element may be sensed. Thereby, the curvature of the lens may be detected quickly and accurately.

The sensor unit may quickly and accurately sense the curvature of the lens by sensing an area of a boundary region between an insulator on an electrode and an electroconductive aqueous solution in the liquid lens or a change in the area based on the electrical signal detected by the detection element.

In particular, the curvature of the lens may be accurately detected by sensing a capacitance corresponding to the area of the boundary region between the insulator on the electrode and the electroconductive aqueous solution in the liquid lens or a change in the area.

In an embodiment, the sensor unit may sense the capacitance corresponding to the area of the boundary region between the insulator on the electrode and the electroconductive aqueous solution in the liquid lens or a change in the size, and feed back the same to apply an electrical signal to the liquid lens such that the curvature of the lens is varied. Thereby, the curvature of the lens may be varied quickly and accurately.

The sensor unit may sense the electrical signal detected by the detection element while the pulse applied to the first electrode of a plurality of electrodes falls from the high level to the low level. Thereby, the curvature of the lens may be sensed quickly and accurately.

Particularly, while a level of a pulse applied to the common electrode or a first electrode of the plurality of electrodes is varied, the sensor unit may sense the curvature of the lens quickly and accurately by sensing the electrical signal detected by the detection element.

Specifically, while a pulse applied to the first electrode among the plurality of electrodes falls from the high level to the low level, the curvature of the lens may be sensed quickly and accurately by summing the levels of the electrical signals detected by the detection element.

In an embodiment, while the level of a pulse applied to the common electrode or the first electrode of the plurality of electrodes is varied, the curvature of the lens may be sensed quickly and accurately by detecting zero-crossing of the electrical signal detected by the detection element.

The lens curvature variation apparatus may include an equalizer to calculate a curvature error based on a calculated curvature and a target curvature, and a pulse width variation controller to generate and output a pulse width variation signal based on the calculated curvature error. Thereby, the curvature of the lens may be sensed quickly and accurately.

BRIEF DESCRIPTION OF DRAWINGS

The above and other objects, features and other advantages of the present invention will be more clearly understood from the following detailed description taken in conjunction with the accompanying drawings, in which:

FIG. 1A is a cross-sectional view of the camera according to an embodiment of the present invention;

FIG. 1B is an internal block diagram of the camera of FIG. 1A;

FIG. 2 is a view illustrating a lens driving method;

FIGS. 3A and 3B are views illustrating a method of driving a liquid lens;

FIGS. 4A to 4C are views showing the structure of a liquid lens;

FIGS. 5A to 5E are views illustrating variation in the lens curvature of a liquid lens;

FIG. 6 is an exemplary internal block diagram of a camera related to the present invention;

FIG. 7 is an exemplary internal block diagram of a camera according to an embodiment of the present invention;

FIGS. 8 to 14 are views referred to in the description of FIG. 7;

BEST MODE FOR CARRYING OUT THE INVENTION

Figure 11A:
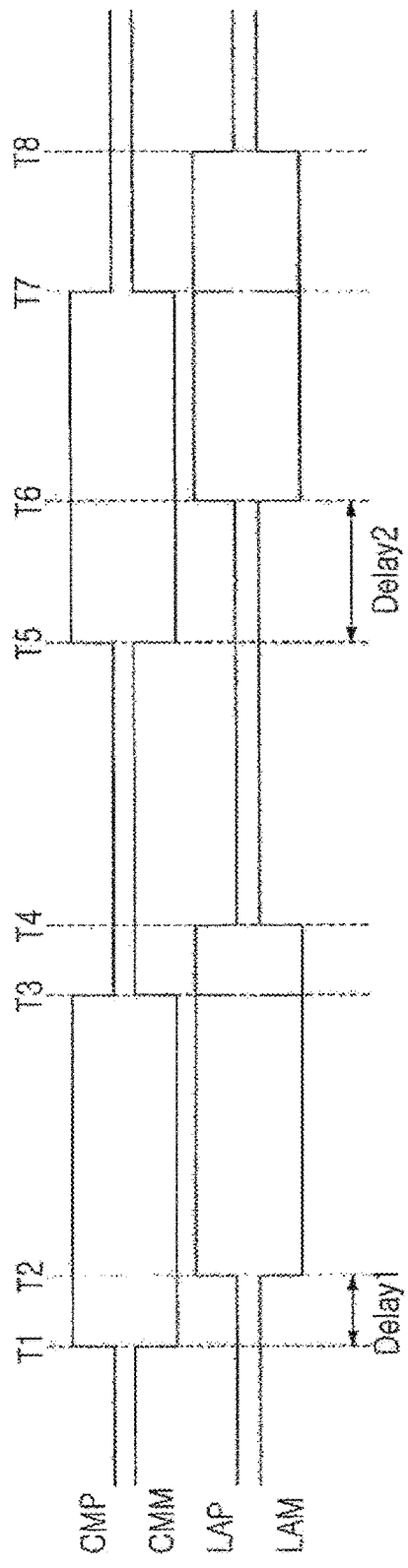

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

FIG. 1A is a cross-sectional view of the camera according to an embodiment of the present invention.

First, FIG. 1A is an example of a cross-sectional view of the camera 195.

The camera 195 may include aperture 194, lens 193 and image sensor 820.

The aperture 194 may obstruct or allow light incident on the lens 193.

The image sensor 820 may include an RGB filter 910 and sensor array 911 to convert an optical signal into an electrical signal to sense RGB colors.

Accordingly, the image sensor 820 may sense and output RGB image.

FIG. 1B is an internal block diagram of the camera of FIG. 1A.

Referring to FIG. 1B, the camera 195 may include lens 193 and image sensor 820, and an image processor 830.

The image processor 830 may generate an RGB image based on the electrical signal from the image sensor 820.

The exposure time may be adjusted based on the electrical signals from the image sensor 820.

FIG. 2 is a view illustrating a lens driving method.

FIG. 2(a) illustrates that light from the focus point 401 is transmitted to the lens 403, the beam splitter 405, the microlens 407, and the image sensor 409, and thus an image PH having a size Fa is formed on the image sensor 409.

Particularly, FIG. 2(a) illustrates that the focus is correctly formed in correspondence with the focus point 401.

Next, FIG. 2(b) illustrates that the lens 403 is shifted toward the focus point 401, as compared to FIG. 2A, and an image PH having a size Fb less than Fa is focused on the image sensor 409.

Particularly, FIG. 2(b) illustrates that the focus is formed excessively ahead in correspondence with the focus point 401.

Next, FIG. 2(c) illustrates that the lens 403 is shifted away from the focus point 401, and thus an image PH having a size Fc greater than Fa is focused on the image sensor 409.

Particularly, FIG. 2(c) illustrates that the focus is formed excessively behind in correspondence with the focus point 401.

That is, FIG. 2 illustrates varying the position of the lens to adjust the focus of a captured image.

As shown in FIG. 2, a voice coil motor (VCM) is used to vary the position of the lens 403.

However, the VCM requires a considerable space for movement of the lens when it is used in a small electronic device such as the mobile terminal of FIG. 1.

In the case of the camera 195 used in the mobile terminal, an optical image stabilization (OIS) function is required in addition to autofocusing.

Since the VCM allows only one-dimensional movement in a direction such as the left-right direction as shown in FIG. 2, it is not suitable to stabilize the image.

In order to address this issue, the present invention uses a liquid lens driving system instead of the VCM system.

In the liquid lens driving system, the curvature of the liquid lens is varied by applying an electrical signal to the liquid lens, and therefore the lens need not be shifted for autofocusing. In addition, in implementing the optical image stabilization function, the liquid lens driving system may perform optical image stabilization in two dimensions or three dimensions.

FIGS. 3A and 3B are views illustrating a method of driving a liquid lens.

First, FIG. 3A(a) illustrates that a first voltage V1 is applied to a liquid lens 500, and the liquid lens operates as a concave lens.

Next, FIG. 3A(b) illustrates that the liquid lens 500 does not change the travel direction of light as a second voltage V2, which is greater than the first voltage V1, is applied to the liquid lens 500.

Next, FIG. 3A(c) illustrates that the liquid lens 500 operates as a convex lens as a third voltage V3, which is greater than the second voltage V2, is applied to the liquid lens 500.

While it is illustrated in FIG. 3A that the curvature or diopter of the liquid lens changes according to the level of the applied voltage, embodiments of the present invention are not limited thereto. The curvature or diopter of the liquid lens may be varied according to a pulse width of an applied pulse.

Next, FIG. 3B(a) illustrates that the liquid in the liquid lens 500 has the same curvature and operates as a convex lens.

Referring to FIG. 3B(a), incident light Lpaa is converged, and corresponding output light Lpab is output.

Next, FIG. 3B(b) illustrates that the traveling light is diverted upward as the liquid in the liquid lens 500 has an asymmetric curved surface.

Referring to FIG. 3B(b), the incident light Lpaa is converged upward, and the corresponding output light Lpac is output.

FIGS. 4A to 4C are views showing the structure of a liquid lens. Particularly, FIG. 4A is a top view of a liquid lens, FIG. 4B is a bottom view of the liquid lens, and FIG. 4C is a cross-sectional view taken along line I-I' in FIGS. 4A and 4C.

Particularly, FIG. 4A corresponds to the right side surface of the liquid lens 500 in FIGS. 3A and 3B, and FIG. 4B corresponds to the left side surface of the liquid lens 500 in FIGS. 3A and 3B.

Referring to the drawings, a common electrode (COM) 520 may be disposed on the liquid lens 500, as shown in FIG. 4A. The common electrode (COM) 520 may be arranged in a tubular shape, and the liquid 530 may be disposed in a region under the common electrode (COM) 520, particularly, a region corresponding to the hollow.

Although not shown in the figures, an insulator (not shown) may be disposed between the common electrode (COM) 520 and the liquid to insulate the common electrode (COM).

As shown in FIG. 4B, a plurality of electrodes (LA to LD) 540a to 540d may be disposed under the common electrode (COM) 520, particularly under the liquid 530. In particular, the plurality of electrodes (LA to LD) 540a to 540d may be arranged so as to surround the liquid 530.

A plurality of insulators 550a to 550d for insulation may be disposed between the plurality of electrodes (LA to LD) 540a to 540d and the liquid 530.

That is, the liquid lens 500 may include the common electrode (COM) 520, the plurality of electrodes (LA to LD) 540a to 540d spaced apart from the common electrode (COM), and the liquid 530 and an electroconductive aqueous solution 595 (see FIG. 4C) disposed between the common electrode (COM) 520 and the plurality of electrodes (LA to LD) 540a to 540d.

Referring to FIG. 4C, the liquid lens 500 may include a plurality of electrodes (LA to LD) 540a to 540d on a first substrate 510, a plurality of insulators 550a to 550d for insulation of the plurality of electrodes (LA to LD) 540a to 540d, a liquid 530 on the plurality of electrodes (LA to LD) 540a to 540d, an electroconductive aqueous solution 595 on the liquid 530, a common electrode (COM) 520 spaced apart from the liquid 530, and a second substrate 515 on the common electrode (COM) 520.

The common electrode 520 may be formed in a tubular shape with a hollow. The liquid 530 and the electroconductive aqueous solution 595 may be disposed in the hollow region. The liquid 530 may be arranged in a circular shape, as shown in FIGS. 4A and 4B. The liquid 530 may be a nonconductive liquid such as oil.

The size of the cross section of the hollow region may increase as it extends from the lower portion thereof to the upper portion thereof, and thus The lower portion of the plurality of electrodes (LA to LD) 540a to 540d may be larger than the upper portion of the plurality of electrodes (LA to LD) 540a to 540d.

In FIG. 4C, the first electrode (LA) 540a and the second electrode (LB) 540b among the plurality of electrodes (LA to LD) 540a to 540d are arranged to be inclined, and the lower portion thereof is large than the upper portion thereof.

As an alternative to the example of FIGS. 4A to 4C, the plurality of electrodes (LA to LD) 540a to 540d may be arranged at an upper position, and the common electrode 520 may be arranged at a lower position.

While FIGS. 4A to 4C illustrates that four electrodes are provided, embodiments are not limited thereto. Two or more electrodes may be formed.

In FIG. 4C, if a pulse-like electrical signal is applied to the first electrode (LA) 540a and the second electrode (LB) 540b a predetermined time after a pulse-like electrical signal is applied to the common electrode 520, a potential difference is made between the common electrode 520, the first electrode (LA) 540a and the second electrode (LB) 540b. Then, the shape of the electroconductive aqueous solution 595 having electrical conductivity changes, and the shape of the liquid 530 in the liquid lens changes according to the change in shape of the electroconductive aqueous solution 595.

The present invention provides a method of simply and quickly sensing the curvature of the liquid 530 formed according to electrical signals applied to the plurality of electrodes (LA to LD) 540a to 540d and the common electrode 520.

According to the present invention, the sensor unit 962 senses the area of the boundary region Ac0 between the first insulator 550a on the first electrode 540a and the electroconductive aqueous solution 595 in the liquid lens 500 or a change in the area.

In FIG. 4C, AM0 is exemplarily given as the area of the boundary region Ac0. In particular, it is illustrated that the area of the boundary region Ac0 that contacts the electroconductive aqueous solution 595 in the inclined portion of the first insulator 550a on the first electrode 540a is AM0.

In FIG. 4C, it is illustrated that the liquid 530 is neither concave nor convex, but is parallel to the first substrate 510 and the like. The curvature given in this case may be defined as 0, for example.

As shown in FIG. 4C, for the boundary region Ac0 contacting the electroconductive aqueous solution 595 in the inclined portion of the first insulator 550a on the first electrode 540a, the capacitance C may be formed according Equation 1.

$$C = \varepsilon \frac{A}{d} \qquad \text{[Equation 1]}$$

Here, ε denotes the dielectric constant of a dielectric 550a, A denotes the area of the boundary region Ac0, and d denotes the thickness of the first dielectric 550a.

Here, when it is assumed that ε and d have fixed values, the area of the boundary region Ac0 may greatly affect the capacitance C.

That is, as the area of the boundary region Ac0 increases, the capacitance C formed in the boundary region Ac0 may increase.

In the present invention, since the area of the boundary region Ac0 is varied as the curvature of the liquid 530 is varied, the area of the boundary region Ac0 or the capacitance C formed in the boundary region Ac0 is sensed using the sensor unit 962.

The capacitance of FIG. 4C may be defined as CAc0.

FIGS. 5A to 5E are views illustrating various curvatures of the liquid lens 500.

FIG. 5A illustrates a case where a first curvature Ria is given to the liquid 530 according to application of an electrical signal to the plurality of electrodes (LA to LD) 540a to 540d and the common electrode 520.

In FIG. 5A, it is illustrated that the area of the boundary region Aaa is AMa (>AM0) as the first curvature Ria is given to the liquid 530. In particular, it is illustrated that the area of the boundary region Aaa contacting the electroconductive aqueous solution 595 in the inclined portion of the first insulator 550a on the first electrode 540a is AMa.

According to Equation 1, the area of the boundary region Aaa in FIG. 5A is larger than that of FIG. 4C, and therefore the capacitance of the boundary region Aaa becomes larger. The capacitance of FIG. 5A may be defined as CAaa, which is greater than the capacitance CAc0 of FIG. 4C.

The first curvature Ria may be defined as having a value of positive polarity. For example, the first curvature Ria may be defined as having a level of +2.

FIG. 5B illustrates a case where a second curvature Rib is formed in the liquid 530 according to application of an electrical signal to the plurality of electrodes (LA to LD) 540a to 540d and the common electrode 520.

In FIG. 5B, AMb (>AMa) is exemplarily given as the area of the boundary region Aba as the second curvature Rib is formed in the liquid 530. In particular, it is illustrated that the area of the boundary region Aba contacting the electroconductive aqueous solution 595 in the inclined portion of the first insulator 550a on the first electrode 540a is AMb.

According to Equation 1, the area of the boundary region Aba in FIG. 5B is larger than that in FIG. 5A, and therefore the capacitance of the boundary region Aba becomes larger. The capacitance of FIG. 5B may be defined as CAba, which is greater than the capacitance CAaa of FIG. 5A.

The second curvature Rib may be defined as having a value of positive polarity less than the first curvature Ria. For example, the second curvature Rib may be defined as having a level of +4.

Referring to FIGS. 5A and 5B, the liquid lens 500 operates as a convex lens, thereby outputting output light LP1a formed by converging the incident light LP1.

Next, FIG. 5C illustrates a case where a third curvature Ric is formed in the liquid 530 according to application of an electrical signal to the plurality of electrodes (LA to LD) 540a to 540d and the common electrode 520.

In particular, FIG. 5C illustrates that AMa is given as the area of the left boundary region Aca, and AMb (>AMa) is given as the area of the right boundary region Acb.

More specifically, the area of the boundary region Aca contacting the electroconductive aqueous solution 595 in the inclined portion of the first insulator 550a on the first electrode 540a is AMa, and the area of the boundary region Acb contacting the electroconductive aqueous solution 595 in the inclined portion of the second insulator 550b on the second electrode 540b is AMb.

Thus, the capacitance of the left boundary region Aca may be CAaa, and the capacitance of the right boundary region Acb may be CAba.

In this case, the third curvature Ric may be defined as having a value of positive polarity. For example, the third curvature Ric may be defined as having a level of +3.

Referring to FIG. 5C, the liquid lens 500 operates as a convex lens, thereby outputting output light LP1b by converging the incident light LP1 further to one side.

Next, FIG. 5D illustrates a case where a fourth curvature Rid is formed in the liquid 530 according to application of an electrical signal to the plurality of electrodes (LA to LD) 540a to 540d and the common electrode 520.

In FIG. 5D, AMd (<AM0) is exemplarily given as the area of the boundary region Ada as the fourth curvature Rid is formed in the liquid 530. In particular, it is illustrated that the area of the boundary region (Ada) contacting the electroconductive aqueous solution 595 in the inclined portion of the first insulator 550a on the first electrode 540a is AMd.

According to Equation 1, the area of the boundary region (Ada) in FIG. 5D is smaller than that of FIG. 4C, and therefore the capacitance of the boundary region (Ada) is reduced. The capacitance of FIG. 5D may be defined as CAda and has a value less than the capacitance CAc0 of FIG. 4C.

In this case, the fourth curvature Rid may be defined as having a value of negative polarity. For example, it may be defined that the fourth curvature Rid has a level of −2.

Next, FIG. 5E illustrates that the fifth curvature Rie is formed in the liquid 530 according to application of an electrical signal to the plurality of electrodes (LA to LD) 540a to 540d and the common electrode 520.

In FIG. 5E, AMe (<AMd) is exemplarily given as the area of the boundary region Aea when the fifth curvature Rie is formed in the liquid 530. In particular, it is illustrated that the area of the boundary region Aea contacting the electroconductive aqueous solution 595 in the inclined portion of the first insulator 550a on the first electrode 540a is AMe.

According to Equation 1, the area of the boundary region Aea in FIG. 5E is smaller than that of FIG. 5D, and therefore the capacitance of the boundary region Aea becomes smaller. The capacitance of FIG. 5E may be defined as CAea, which is less than the capacitance CAda of FIG. 5D.

In this case, the fifth curvature Rie may be defined as having a value of negative polarity. For example, the fifth curvature Rie may be defined as having a level of −4.

Referring to FIGS. 5D and 5E, the liquid lens 500 operates as a concave lens, thereby outputting output light LP1c by diverging the incident light LP1.

FIG. 6 is an exemplary internal block diagram of a camera related to the present invention.

Referring to FIG. 6, the camera 195x may include a lens curvature variation apparatus 800, an image sensor 820, an image processor 860, a gyro sensor 830, and a liquid lens 500.

The lens curvature variation apparatus 800 may include a lens driver 860, a pulse width variation controller 840, and a power supply 890.

The lens curvature variation apparatus 800 of FIG. 6 operates as follows. The pulse width variation controller 840 outputs a pulse width variation signal V corresponding to a target curvature, and the lens driver 860 may output corresponding voltages to the plurality of electrodes and the common electrode of the liquid lens 500 using the pulse width variation signal V and the voltage Vx of the power supply 890.

That is, the lens curvature variation apparatus 800 of FIG. 6 operates as an open loop system to vary the curvature of the liquid lens.

According to this method, the curvature of the liquid lens 500 cannot be sensed, except that corresponding voltages are output to the plurality of electrodes and the common electrode of the liquid lens 500 according to the target curvature.

In addition, according to the lens curvature variation apparatus 800 of FIG. 6, when the curvature of the liquid lens 500 needs to be varied to perform optical image stabilization, it may be difficult to accurately vary the curvature since the curvature is not sensed.

Therefore, in the present invention, the lens curvature-variable device 800 is not implemented as an open loop system as shown in FIG. 6, but is implemented as a closed loop system.

That is, in order to identify the curvature of the liquid lens 500, the capacitance formed in the insulator on the electrode in the liquid in the liquid lens 500 and the boundary region Ac0 contacting the electroconductive aqueous solution 595 is sensed, and is fed back to calculate the difference between the target curvature and the current curvature and perform a control operation corresponding to the difference.

Accordingly, the curvature of the liquid lens 500 may be identified quickly and accurately, and the curvature of the liquid lens 500 may be controlled quickly and accurately so as to correspond to the target curvature. This operation will be described in more detail with reference to FIG. 7 and subsequent drawings.

FIG. 7 is an exemplary internal block diagram of a camera according to an embodiment of the present invention.

Referring to FIG. 7, a camera 195m according to an embodiment of the present invention may include a lens curvature variation apparatus 900 to vary the curvature of a liquid lens 500, an image sensor 820 to convert light from the liquid lens 500 into an electrical signal, and an image processor 930 to perform image processing based on the electrical signal from the image sensor 820.image processor In particular, the camera 195m of FIG. 7 may further include a gyro sensor 915.

The image processor 930 may output focus information AF about an image, and the gyro sensor 915 may output tremor information OIS.

Thus, the controller 970 in the lens curvature variation apparatus 900 may determine the target curvature based on the focus information AF and the tremor information OIS.

The lens curvature variation apparatus 900 according to an embodiment of the present invention may include a lens driver 960 to apply an electrical signal to the liquid lens 500, a sensor unit 962 to sense the curvature of the liquid lens 500 formed based on the electrical signal, and a controller 970 to control the lens driver 960 so as to form a target curvature of the liquid lens 500 based on the sensed curvature. The sensor unit 962 may sense the size or change in size of the area of the boundary region Ac0 between an insulator on an electrode and an electroconductive aqueous solution 595 in the liquid lens 500. Thus, the curvature of the lens may be sensed quickly and accurately.

According to an embodiment of the present invention, the lens curvature variation apparatus 900 may further include a liquid lens 500 having a curvature varied based on an applied electrical signal.

According to an embodiment of the present invention, the lens curvature variation apparatus 900 may include a power supply 990 to supply power, and an analog-to-digital (AD) converter 967 to convert a signal related to the capacitance sensed by the sensor unit 962 into a digital signal.

The lens curvature variation apparatus 900 may further include a plurality of conductive lines CA1 and CA2 for supplying an electrical signal from the lens driver 960 to each of the electrodes (the common electrode and the plurality of electrodes) in the liquid lens 500, and a switching element SWL disposed between one CA2 of the plurality of conductive lines and the sensor 962.

In the figure, a contact point between the conductive line CA2 for applying an electrical signal to any one of the plurality of electrodes in the liquid lens 500 and the sensor unit 962 or the liquid lens 500 may be referred to as node A.

In the present invention, an electrical signal is applied to each of the electrodes (the common electrode and the plurality of electrodes) in the liquid lens 500 through the plurality of conductive lines CA1 and CA2 to sense the curvature of the liquid lens 500. Thus, a curvature may be formed in the liquid 530 as shown in FIGS. 5A to 5E.

According to an embodiment of the present invention, the sensor unit 962 may sense an electrical signal detected by a detection element Rsens provided in the lens driver 960.

That is, the electrical signal detected by the detection element Rsens provided in the lens driver 960 is sensed using the sensor unit 962, without a separate switching element arranged between the sensor unit 962 and the liquid lens 500.

For the operation of the sensor unit 962, the lens driver 960 according to the embodiment of the present invention may include a detection element Rsens to supply an electrical signal to the liquid lens by the switching operation of the switching element S'a or S'b and connected to one end of the switching element S'a or S'b.

In particular, as shown in FIG. 10A or 10B, the lens driver 960 may include a first upper switching element Sa and a first lower switching element S' a, which are connected in series to each other, and a second upper switching element Sb and a second lower switching element S'b, which are connected in parallel to the first upper and lower switching elements Sa and Sb and are connected in series to each other.

In addition, as shown in FIG. 10A, the lens driver 960 may include a detection element Rsens disposed between the second lower switching element S'b and the ground terminal GND.

According to this configuration, when the second lower switching element S'b is turned on, a predetermined electrical signal may be supplied to the detection element Rsens, and the sensor unit 962 may sense the electrical signal detected by the detection element Rsens.

In particular, when the second lower switching element S'b is turned on, the sensor unit 962 may sense the area of the boundary region Ac0 between the insulator on the electrodes and the electroconductive aqueous solution 595 in the liquid lens 500 or a change in the area or sense the capacitance of the boundary region Ac0, based on the electrical signal detected by the detection element Rsens.

Alternatively, the lens driver 960 may include a detection element Rsens disposed between the first lower switching element S'a and the ground terminal GND, as shown in FIG. 10B.

According to this configuration, when the first lower switching element S'a is turned on, a predetermined electrical signal may be supplied to the detection element Rsens, and the sensor unit 962 may sense the electrical signal detected by the detection element Rsens.

In particular, when the first lower switching element S'a is turned on, the sensor unit 962 may sense the area of the boundary region Ac0 between the insulator on the electrodes and the electroconductive aqueous solution 595 in the liquid lens 500 or a change in the area or sense the capacitance of the boundary region Ac0, based on the electrical signal detected by the detection element Rsens.

In this case, since a separate switching element is not required for sensing in the sensor unit 962, manufacturing costs and the like may be reduced, and separate driving of the switching element is not necessary.

When an electrical signal is applied to the electrodes in the liquid lens 500, a curvature may be formed in the liquid lens 500, and an electrical signal corresponding to the formed curvature may be supplied to the sensor unit 962 via the switching element SWL.

If the curvature calculated based on the capacitance sensed during the first period is less than a target curvature, the controller 970 may control the pulse width of the pulse width variation control signal supplied to the driver 960 to be increased in order to obtain the target curvature.

Thus, the time difference between the pulses applied to the common electrode 530 and the plurality of electrodes may be increased, thereby increasing the curvature formed in the liquid 530.

Accordingly, the controller 970 may calculate the curvature based on the sensed capacitance and may determine whether or not the curvature has reached the target curvature. If the curvature has reached the target curvature, the controller 970 may control a corresponding electrical signal to be supplied to each of the electrodes.

According to this operation, as the electrical signal is supplied, the curvature of the liquid 530 may be formed, and may be sensed immediately. Therefore, the curvature of the liquid lens 500 may be identified quickly and accurately.

The lens driver 960 and the sensor unit 962 may be implemented by a single module 965.

The lens driver 960 and the sensor unit 962, the controller 970, the power supply 990, the AD converter 967, and the switching element SWL shown in the figure may be implemented by a single system on chip (SOC).

As shown in FIGS. 4A to 4C, the liquid lens 500 may include a common electrode (COM) 520, a liquid 530 on the common electrode (COM) 520, an electroconductive aqueous solution 595 on the liquid 530, and a plurality of electrodes (LA to LD) 540a to 540d spaced apart from the liquid 530.

As illustrated in FIGS. 5A to 5E, the sensor unit 962 may sense the size or change in size of the area of the boundary region Ac0 between an insulator on the electrodes and the electroconductive aqueous solution 595 in the liquid lens 500, or may sense a capacitance corresponding thereto.

An analog signal related to the capacitance sensed by the sensor unit 962 may be converted into a digital signal through the AD converter 967 and input to the controller 970.

As illustrated in FIGS. 5A to 5E, as the curvature of the liquid lens 500 increases, the area of the boundary region Ac0 increases, and consequently the capacitance of the boundary region Ac0 increases.

In the present invention, it is assumed that the curvature is calculated using the capacitance sensed by the sensor unit 962 based on the feature described above.

The controller 970 may control the level of a voltage applied to the liquid lens 500 to increase or the pulse width to increase in order to increase the curvature of the liquid lens 500.

As shown in FIG. 5C, when voltages of different levels or different pulse widths are applied to a first electrode 540a and a third electrode 540c among the plurality of electrodes (LA to LD) 540a to 540d, a first capacitance of a first end portion Aca of the liquid 530 and a second capacitance of a second end portion Acb of the liquid 530 will differ from each other.

Thus, the sensor unit 962 may sense the capacitances of the first end portion Aca and the second end portion Acb of the liquid 530, respectively.

By sensing the capacitances around the end portions of the liquid 530 in the liquid lens 500, the curvature of the lens may be accurately detected.

In other words, by sensing the capacitances of a plurality of boundary regions between the insulator on the electrodes and the electroconductive aqueous solution 595 in the liquid lens 500, the curvature of the liquid lens may be accurately detected.

When a constant voltage is applied to the common electrode (COM) 520 and a pulse is applied to the plurality of electrodes (LA to LD) 540a to 540d, the sensor unit 962 may sense the capacitances of a plurality of boundary regions between the insulator on the plurality of electrodes (LA to LD) 540a to 540d and the electroconductive aqueous solution 595.

When a constant voltage is applied to the plurality of electrodes (LA to LD) 540a to 540d and a pulse is applied to the common electrode (COM) 520, the capacitance of the boundary region between the insulator on the common electrode (COM) 520 and the electroconductive aqueous solution 595 may be sensed.

The controller 970 may calculate the curvature of the liquid lens 500 based on the capacitance sensed by the sensor unit 962.

In this operation, the controller 970 may calculate the curvature of the liquid lens 500 such that the curvature increases as the capacitance sensed by the sensor unit 962 increases.

Then, the controller 970 may control the liquid lens 500 to have a target curvature.

The controller 970 may calculate the curvature of the liquid lens 500 based on the capacitance sensed by the sensor unit 962, and output a pulse width variation signal V to the lens driver 960 based on the calculated curvature and the target curvature.

Then, the lens driver 960 may use the pulse width variation signal V and the voltage Lv2 of the power supply 990 to output corresponding electrical signals to the plurality of electrodes (LA to LD) 540a to 540d and the common electrode (520).

Thus, as the capacitance of the liquid lens 500 is sensed and fed back, and an electrical signal is applied to the liquid lens 500 to vary the curvature of the lens, the curvature of the lens may be varied quickly and accurately.

The controller 970 may include an equalizer 972 to calculate a curvature error based on the calculated curvature and the target curvature, and a pulse width variation controller 940 to generate and output a pulse width variation signal V based on the calculated curvature error $\Phi$.

Accordingly, if the calculated curvature is greater than the target curvature, the controller 970 may control, based on the calculated curvature error $\Phi$, the duty of the pulse width variation signal V to increase or a delay, which is a time difference between a plurality of pulses applied to the liquid lens 500, to increase. Accordingly, the curvature of the liquid lens 500 may be varied quickly and accurately.

The controller 970 may receive focus information AF from the image processor 930 and tremor information OIS from the gyro sensor 915, and determine the target curvature based on the focus information AF and the tremor information OIS.

Here, the update cycle of the determined target curvature is preferably longer than the update cycle of the curvature calculated based on the sensed capacitance of the liquid lens 500.

Accordingly, since the update cycle of the calculated curvature is shorter than the update cycle of the target curvature, the curvature of the liquid lens 500 may be quickly changed to a desired curvature.

FIGS. 8 to 14 are views referred to in the description of FIG. 7.

FIG. 8 shows curvature change curves of the liquid lens 500 in the liquid curvature variation apparatus 800 of FIG. 6 and the lens curvature variation apparatus 900 of FIG. 7.

Referring to FIG. 8, GRo represents a curvature change curve of the liquid lens 500 in the lens curvature variation apparatus 800 of FIG. 6, and GRc represents a curvature change curve of the liquid lens 500 in the lens curvature variation apparatus 900 of FIG. 8.

In particular, the figure illustrates a case where that a voltage for changing the curvature to a target curvature is applied to the liquid lens 500 at time Tx, and is interrupted at time Ty.

It can be seen from the two curves that the change in curvature in the case of the lens curvature variation apparatus 800 of FIG. 6 of the open loop system is slowly settled to a target diopter, and the change in curvature in the case of the lens curvature variation apparatus 900 of FIG. 7 of the closed loop system is quickly and precisely settled, although not accurate.

The lens curvature variation apparatus 900 of FIG. 7 of the closed loop system may have a settling time shorter than the lens curvature variation apparatus 800 of FIG. 6 of the open loop system by about 70%.

Therefore, with the lens curvature variation apparatus 900 of FIG. 7 of the closed loop system, the curvature and the diopter may be formed quickly and accurately.

The diopter may correspond to the curvature of the liquid 530 illustrated in FIGS. 5A to 5E. Accordingly, it may be defined that the diopter increases as the curvature of the liquid 530 increases, and decreases as the curvature decreases.

For example, as shown in FIGS. 5A and 5B, when the curvature has a level of +2 or +4, the diopter may be defined as having a level of +2 or +4 corresponding to a convex lens. When the curvature has a level of 0, the diopter may be defined as having a level of 0 corresponding to the plane lens. When the curvature has a level of −2 or −4 as shown in FIGS. 5D and 5E, the diopter may be defined as having a level of −2 or −4 corresponding to the concave lens.

FIG. 8B illustrates a timing diagram for the common electrode COM, the first electrode LA, and the switching element SWL in the lens curvature variation apparatus 900 of FIG. 7.

Referring to FIG. 8B, during a period Dt1 between time T1 and time T3, the switching element SWL is turned on.

In order to sense the capacitance of the boundary region Ac0 through the sensor unit 962, a curvature is preferably formed in the liquid lens 500 during the period Da between time T1 and time T3.

In order to ensure accuracy and stability of the sensing operation of the sensor unit 962 in the present invention, a pulse is applied to one of the common electrode and the plurality of electrodes in the liquid lens 500 during the period Dt1 between the time T1 and the time T3.

In particular, as shown in FIG. 8B, a pulse having a pulse width of Dt2 may be applied to the common electrode 530 at time T2. Accordingly, after time T2, a curvature of the liquid lens 500 may be formed.

Accordingly, the sensor unit 962 may sense capacitances formed by the electroconductive aqueous solution 595 and the electrodes according to the size or change in size of the area of the boundary region Ac0 between the insulator on the electrodes and the electroconductive aqueous solution 595 in the liquid lens 500 during a period between time T2 and time T3 in the period Da between time T1 and time T3.

During the period between time T2 and time T3, the sensor unit 962 may sense a potential difference or an electric current between the electroconductive aqueous solution 595 and the electrodes corresponding to the size or change in size of the area of the boundary region Ac0 between the insulator on the electrodes and the electroconductive aqueous solution 595 in the liquid lens 500.

Next, at time T4, a pulse having a pulse width of Dt3 may be applied to the first electrode LA.

That is, a high-level voltage may be applied to the common electrode COM at time point T2, and a high-level voltage may be applied to the first electrode LA at time point T4.

The curvature formed in the liquid 530 in the liquid lens 500 may be varied according to a time difference DFF1 between the pulse applied to the common electrode COM and the pulse applied to the first electrode LA.

For example, as the time difference DFF1 between the pulses increases, the area of the boundary region Ac0 in which the electrodes contact the electroconductive aqueous solution 595 may increase, and accordingly the capacitance and the curvature may increase.

FIGS. 9A and 9B are diagrams illustrating various embodiments of the sensor unit.

A sensor unit 962a in the lens curvature variation apparatus 900a of FIG. 9A may include an integrator 1114 to sum the levels of the electrical signals SENS detected by the detection element Rsens of the lens driver 960, and an amplifier 1116 to amplify the electrical signals summed by the integrator 1114.

Particularly, while the level of the pulse applied to the common electrode (COM) 520 or the first electrode LA of the plurality of electrodes (LA to LD) 540a to 540d is varied, the sensor unit 962a may sum, through the integrator 1114, the levels of the electrical signals SENS detected by the detection element Rsens and amplify, through the amplifier 1116, the summed level obtained by the integrator 1114.

The level sum of the electrical signal SENS obtained during variation in the level of the pulse applied to the common electrode (COM) 520 or the first electrode LA of the plurality of electrodes (LA to LD) 540a to 540d may be varied depending on the area of the boundary region between the insulator on the electrodes and the electroconductive aqueous solution in the liquid lens 500 or a change in the area.

That is, the level sum of the electrical signal SENS obtained during variation of the level of the pulse applied to the common electrode (COM) 520 or the first electrode LA of the plurality of electrodes (LA to LD) 540a to 540d may correspond to an RC time constant.

As described above, since the area of the boundary region between the insulator on the electrodes and the electroconductive aqueous solution in the liquid lens 500 or the change in the area corresponds to a capacitance, the capacitance of the liquid lens 500 may be calculated using the sum of the levels of the electrical signals SENS.

Accordingly, the sensor unit 962a of FIG. 9A may sense the capacitance of the liquid lens 500.

As the time difference between the first pulse applied to the common electrode (COM) 520 and the second pulse applied to the first electrode LA among the plurality of electrodes (LA to LD) 540*a* to 540*d* increases, the output value of the integrator 1114 increases.

That is, as the time difference between the first pulse and the second pulse increases, the capacitance of the liquid lens 500 increases. The time difference between the first pulse and the second pulse may be called a delay.

Next, the sensor unit 962*b* in the lens curvature variation apparatus 900*a* of FIG. 9B may include a zero-crossing detector 1124 to detect zero-crossing of the electrical signal SENS detected by the detection element Rsens of the lens driver 960.

Particularly, while the level of the pulse applied to the common electrode (COM) 520 or the first electrode LA of the plurality of electrodes (LA to LD) 540*a* to 540*d* is varied, the sensor unit 962*b* may detect, through the zero-crossing detector 1124, zero-crossing of the electrical signal SENS detected by the detection element Rsens of the lens driver 960.

In addition, a period from the time point at which the level of the pulse applied to the first electrode LA of the plurality of electrodes (LA to LD) 540*a* to 540*d* changes to the time point at which zero-crossing is detected may be counted using a timer or the like.

The period from the time point at which the level of the pulse applied to the first electrode LA among the plurality of electrodes (LA to LD) 540*a* to 540*d* changes to the time point at which zero-crossing is detected may correspond to an RC time constant.

As described above, since the area of the boundary region between the insulator on the electrodes and the electroconductive aqueous solution in the liquid lens 500 or the change in the area corresponds to a capacitance, the capacitance of the liquid lens 500 may be calculated using the level sum of the electrical signals SENS.

Accordingly, the sensor unit 962*b* of FIG. 9B may sense the capacitance of the liquid lens 500.

The lens driver applicable to both FIGS. 9A and 9B may be illustrated as in FIG. 10A or 10B.

FIG. 10A is an exemplary internal circuit diagram of the lens driver of FIG. 9A or 9B.

Referring to FIG. 10A, the lens driver 960*a* of FIG. 10A may include a first driver 961 to drive the lens.

The first driver 961 may include first upper and lower switching elements Sa and S'a connected in series to each other and second upper and lower switching elements Sb and S'b connected in series to each other.

Here, the first upper and lower switching elements Sa and S'a and the second upper and lower switching elements Sb and S'b are connected in parallel to each other.

A power of level LV2 from the power supply 990 may be supplied to the first upper switching element Sa and the second upper switching element Sb.

The lens driver 960 of FIG. 10A may include a detection element Rsens disposed between the second lower switching element S'b and the ground terminal GND.

According to this configuration, when the second lower switching element S'b is turned on, a predetermined electrical signal may be supplied to the detection element Rsens, and the sensor unit 962 may sense the electrical signal detected by the detection element Rsens.

In particular, when the second lower switching element S'b is turned on, the sensor unit 962 may sense the area of the boundary region Ac0 between the insulator on the electrodes and the electroconductive aqueous solution 595 in the liquid lens 500 or a change in the area or sense the capacitance of the boundary region Ac0, based on the electrical signal detected by the detection element Rsens.

FIG. 10B is similar to FIG. 10A. The lens driver 960 of FIG. 10B may include a first upper switching element Sa and a first lower switching element S'a, which are connected in series to each other, and a second upper switching element Sb and a second lower switching element S'b, which are connected in parallel to the first upper and lower switching elements Sa and Sb and are connected in series to each other.

The lens driver 960 of FIG. 10B may include a detection element Rsens disposed between the first lower switching element S'a and the ground terminal GND.

According to this configuration, when the first lower switching element S'a is turned on, a predetermined electrical signal may be supplied to the detection element Rsens, and the sensor unit 962 may sense the electrical signal detected by the detection element Rsens.

In particular, when the first lower switching element S'a is turned on, the sensor unit 962 may sense the area of the boundary region Ac0 between the insulator on the electrodes and the electroconductive aqueous solution 595 in the liquid lens 500 or a change in the area or sense the capacitance of the boundary region Ac0, based on the electrical signal detected by the detection element Rsens.

According to the lens driver 960 of FIG. 10A or 12B, since a separate switching element is not required for sensing in the sensor unit 962, manufacturing costs and the like may be reduced, and separate driving of the switching element is not necessary.

While FIG. 10A or 12B shows a resistance element of Rsens as the detection element, embodiments of the present invention are not limited thereto. The detection element may be implemented by various circuit elements such as a switching element, a capacitor element, an inductor, and a transformer.

Hereinafter, the operation of the lens driver 960 will be described based on the structure of the lens driver 960 of FIG. 10A.

Figure 11B:
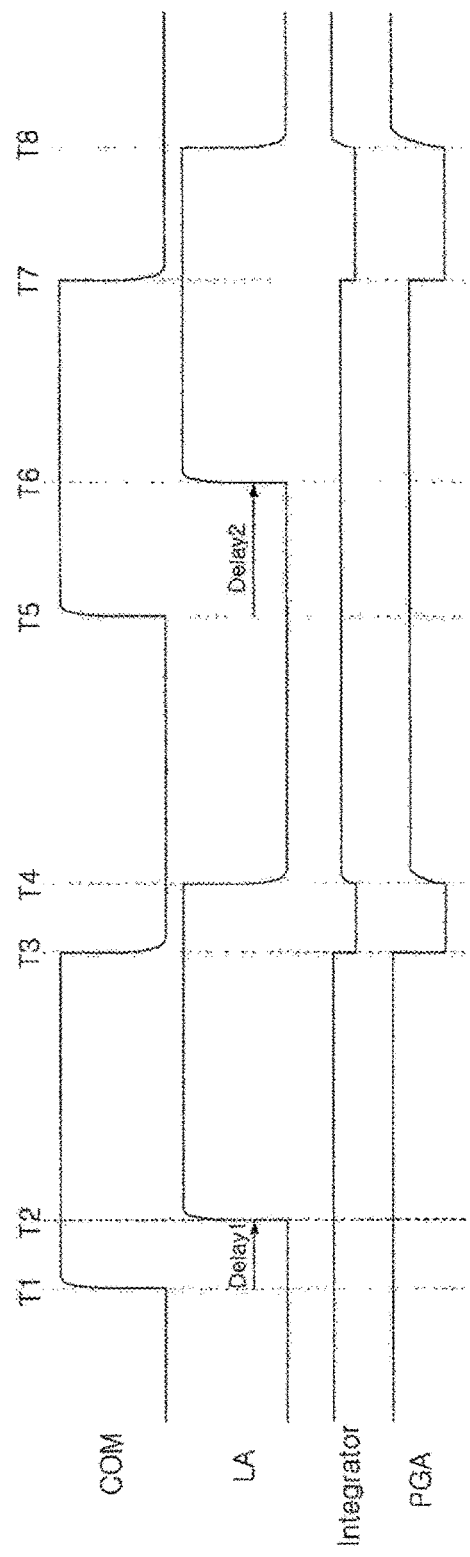

FIG. 11A is an exemplary waveform diagram for explaining the operation of the lens driver 960 of FIG. 10A, and FIG. 11B is an exemplary diagram referred to for explaining the operation of the sensor unit 962*a* of FIG. 9A.

Referring to FIGS. 11A and 11B, at time T1, a high level is applied to CMP and a low level is applied to CMM. Accordingly, as shown in FIG. 11B, a high-level electrical signal is applied to the common electrode COM at time T1.

Next, at time T2, the high level is applied to CMP and the low level is applied to CMM. Accordingly, as shown in FIG. 11B, a high-level electrical signal is applied to the first electrode LA at time T2.

That is, a first pulse is applied to the common electrode COM at time T1, and a second pulse is applied to the first electrode LA at time T2.

The time difference (delay) Delay1 of the second pulse of the first pulse enables a first curvature to be formed in the liquid 530.

Next, at time T3, the low level is applied to CMP and the high level is applied to CMM. Thus, as shown in FIG. 11B, a low-level electrical signal is applied to the common electrode COM at time T2.

At time T3, the integrator 1114 is initialized to maintain the low level.

Next, at time T4, the low level is applied to CMP and the high level is applied to CMM. Accordingly, as shown in FIG. 11B, a low-level electrical signal is applied to the first electrode LA at time T4.

At time T4, the second lower switching element S'b of FIG. 9A is turned on, and thus the electrical signal SENS detected by the detection element Rsens is applied to the sensor unit 962a.

FIG. 12A(a) illustrates an electrical signal SENS applied to the integrator 1114 at time T4. The rate of change of the falling curve in FIG. 12A(a) may correspond to the RC time constant.

Accordingly, the integrator 1114 in the sensor unit 962a sums the electrical signals SENS detected by the detection element Rsens from time T4.

The value of the sum obtained by the integrator 1114 in the sensor unit 962a may be given as shown in FIG. 12A(b). The amplifier 1116 amplifies the signal from the integrator 1114.

As a result, the sensor unit 962a may sense the area of the boundary region Ac0 between the insulator on the electrodes and the electroconductive aqueous solution 595 in the liquid lens 500 or a change in the area, which is formed by the time difference (delay) Delay1 of the second pulse of the first pulse at time T4, according to a first output value of the amplifier 1116.

In other words, the sensor unit 962a may sense a first capacitance of the boundary region of an inclined part of the first insulator 550a formed on the first electrode (LA) 540a by the time difference (delay) Delay1 of the second pulse of the first pulse to contact the electroconductive aqueous solution 595.

Next, time T5 to time T8 correspond to time T1 to time T4, respectively.

However, in this example, delay2, which is a time difference between T5 and T6, is larger than delay1, which is a time difference between T1 and T2. The rate of change of the falling curve in FIG. 12B(a) may correspond to the RC time constant.

Accordingly, a second curvature greater than the first curvature may be formed in the liquid 530 by the time difference (delay) Delay2 of the second pulse of the first pulse.

At time T8, the second lower switching element S'b of FIG. 9A is turned on, and thus the electrical signal SENS detected by the detection element Rsens is applied to the sensor unit 962a.

FIG. 12B(a) illustrates an electrical signal SENS applied to the integrator 1114 at time T8.

The integrator 1114 in the sensor unit 962a sums the electrical signals SENS detected by the detection element Rsens from time T8.

The value of the sum obtained by the integrator 1114 in the sensor unit 962a may be given as shown in FIG. 12B(b). The amplifier 1116 amplifies the signal from the integrator 1114.

The sensor unit 962a may sense the area of the boundary region Ac0 between the insulator on the electrodes and the electroconductive aqueous solution 595 in the liquid lens 500 or a change in the area, which is formed by the time difference (delay) Delay2 of the second pulse of the first pulse at time T8, according to a second output value of the amplifier 1116.

In other words, the sensor unit 962a may sense a second capacitance of the boundary region of an inclined part of the first insulator 550a formed on the first electrode (LA) 540a by the time difference (delay) Delay2 of the second pulse of the first pulse to contact the electroconductive aqueous solution 595.

FIG. 11C is a diagram illustrating the operation of the sensor unit 962b of FIG. 9.

The diagram of FIG. 11C is almost similar to the waveform diagram of FIG. 11B, but illustrates the operation of a zero-crossing detector 1124 to detect zero-crossing of the electrical signal SENS detected by the detection element Rsens, in place of the integrator 1114 and the amplifier 1116.

The zero-crossing detector 1124 maintains the low level from time T1 to time T3 and detects, at time T4, the high level of the electrical signal SENS detected by the detection element Rsens and counts the points where the high level is subjected to zero-crossing.

At time T4, the second lower switching element S'b of FIG. 9A is turned on, and thus the electrical signal SENS detected by the detection element Rsens is applied to the sensor unit 962b.

FIG. 13A(a) illustrates an electrical signal SENS applied to the zero-crossing detector 1124 at time T4. The rate of change of the falling curve in FIG. 13A(a) may correspond to an RC time constant.

Thus, as shown in FIG. 13A(b), the zero-crossing detector 1124 in the sensor unit 962b counts the time from time T4 to the point Tz1 at which the electrical signal detected by the detection element Rsens is subjected to zero-crossing. Thereby, a period Pz1 may be detected.

Accordingly, the sensor unit 962b may sense the area of the boundary region Ac0 between the insulator on the electrodes and the electroconductive aqueous solution 595 in the liquid lens 500 or a change in the area, which is formed by the time difference (delay) Delay1 of the second pulse of the first pulse, according to the detected period Pz1 at time T4.

In other words, at time T4, the sensor unit 962b may sense a first capacitance of the boundary region of an inclined part of the first insulator 550a formed on the first electrode (LA) 540a by the time difference (delay) Delay1 of the second pulse of the first pulse to contact the electroconductive aqueous solution 595.

At time T8, the second lower switching element S'b of FIG. 9A is turned on, and thus the electrical signal SENS detected by the detection element Rsens is applied to the sensor unit 962b.

FIG. 13B(a) illustrates an electrical signal SENS applied to the zero-crossing detector 1124 at time T8. The rate of change of the falling curve in FIG. 13B(a) may correspond to an RC time constant.

Thus, as shown in FIG. 13B(b), the zero-crossing detector 1124 in the sensor unit 962b counts the time from time T8 to the point Tz2 at which the electrical signal detected by the detection element Rsens is subjected to zero-crossing. Thereby, a period Pz2 may be detected.

The sensor unit 962b may sense the area of the boundary region Ac0 between the insulator on the electrodes and the electroconductive aqueous solution 595 in the liquid lens 500 or a change in the area, which is formed by the time difference (delay) Delay2 of the second pulse of the first pulse, according to the detected period Pz2 at time T8.

In other words, at time T8, the sensor unit 962b may sense a second capacitance of the boundary region of an inclined part of the first insulator 550a formed on the first electrode (LA) 540a by the time difference (delay) Delay2 of the second pulse of the first pulse to contact the electroconductive aqueous solution 595.

As shown in FIG. 14, as the time difference (delay) of the second pulse of the first pulse increases, the capacitance in the liquid lens 500 sensed by the sensor unit 962 increases.

Figure 15A:
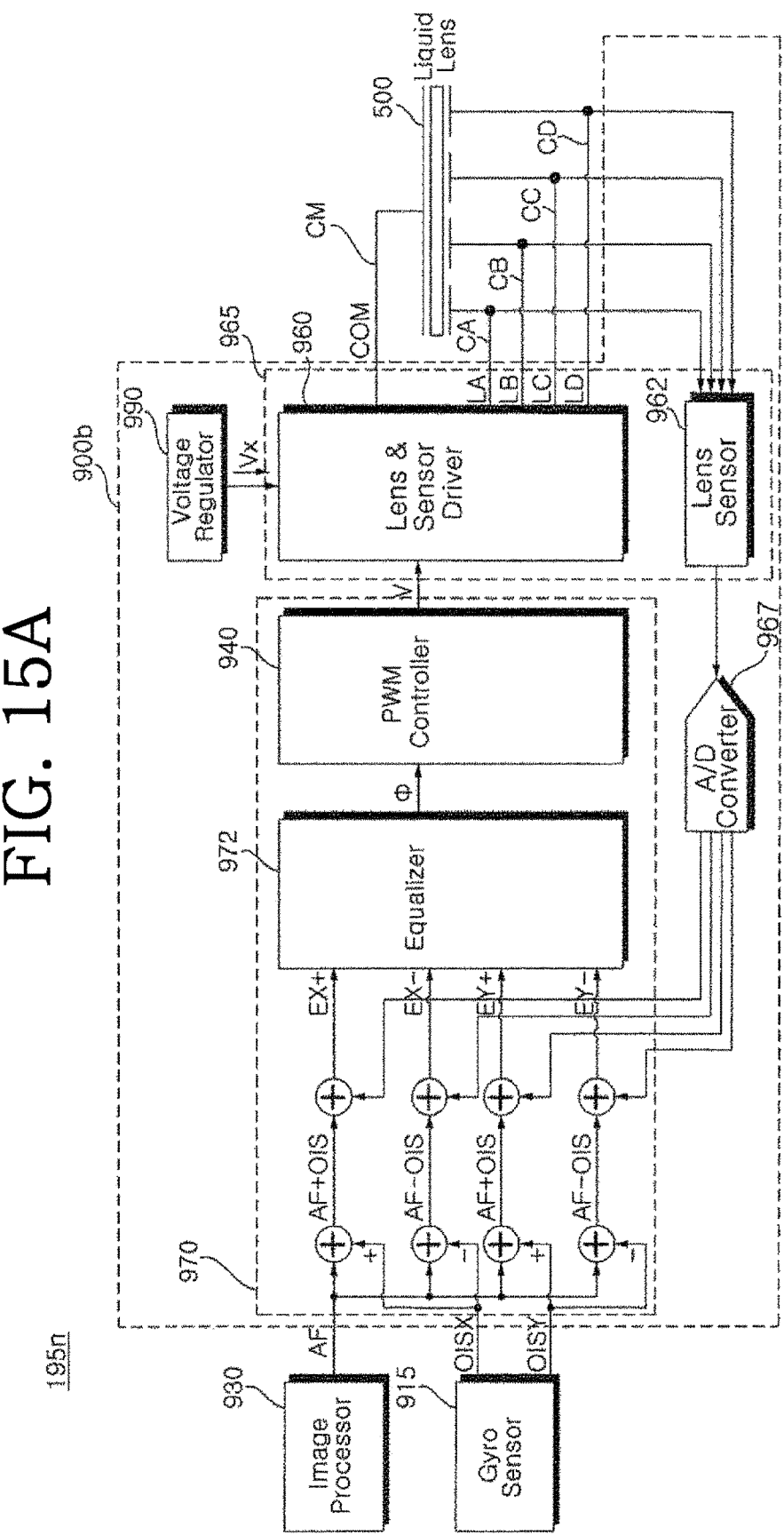
FIG. 15A is an exemplary internal block diagram of a camera according to another embodiment of the present invention.

FIG. 15A is an exemplary internal block diagram of a camera according to another embodiment of the present invention.

Referring to FIG. 15A, the camera 195n and the lens curvature variation apparatus 900b of FIG. 15A are similar to the camera 195m and the lens curvature variation apparatus 900 of FIG. 7, except that the sensor unit 962 senses the capacitance of the ends of the plurality of liquids 530 corresponding to the plurality of electrodes (LA to LD) 540a to 540d.

To this end, a low-level voltage may be applied to the common electrode (COM) 520, and a pulse signal may be applied to the plurality of electrodes (LA to LD) 540a to 540d.

As described above with reference to FIG. 7, the lens driver 960 includes a detection element Rsens connected to one end of the switching element S'a or S'b.

At time T4 or T8 when the switching element S'a or S'b is turned on, the sensor unit 962 senses an electrical signal detected by the detection element Rsens.

Thus, the sensor unit 962 may sense a capacitance for the boundary region between the insulator on the plurality of electrodes (LA to LD) 540a to 540d and the electroconductive aqueous solution and transmit the same to the controller 970.

Thereby, the capacitances for a plurality of boundary regions of the liquid lens 500 may be sensed.

Further, the camera 195n of FIG. 15A may vary the voltages applied to the plurality of electrodes (LA to LD) 540a to 540d in response to tremor correction to form an asymmetric curvature. Accordingly, tremor correction may be performed accurately and quickly.

In particular, the gyro sensor 915 may output x-axis tremor information OISx and y-axis tremor information OISy. The x-axis tremor information OISx and the y-axis tremor information OISy are input to the controller 970.

The control unit 970 may set a target curvature based on the focus information AF about an image from the image processor 930.

The controller 970 may set a target x-axis tilt based on the x-axis tremor information OISx and set a target y-axis tilt based on the y-axis tremor information OISy.

The controller 970 may feed back the signal sensed by the sensor unit 960 to form the target curvature.

The controller 970 may feed back the signal sensed by the sensor unit 960 to form the target x-axis tilt and the target y-axis tilt.

Figure 15B:
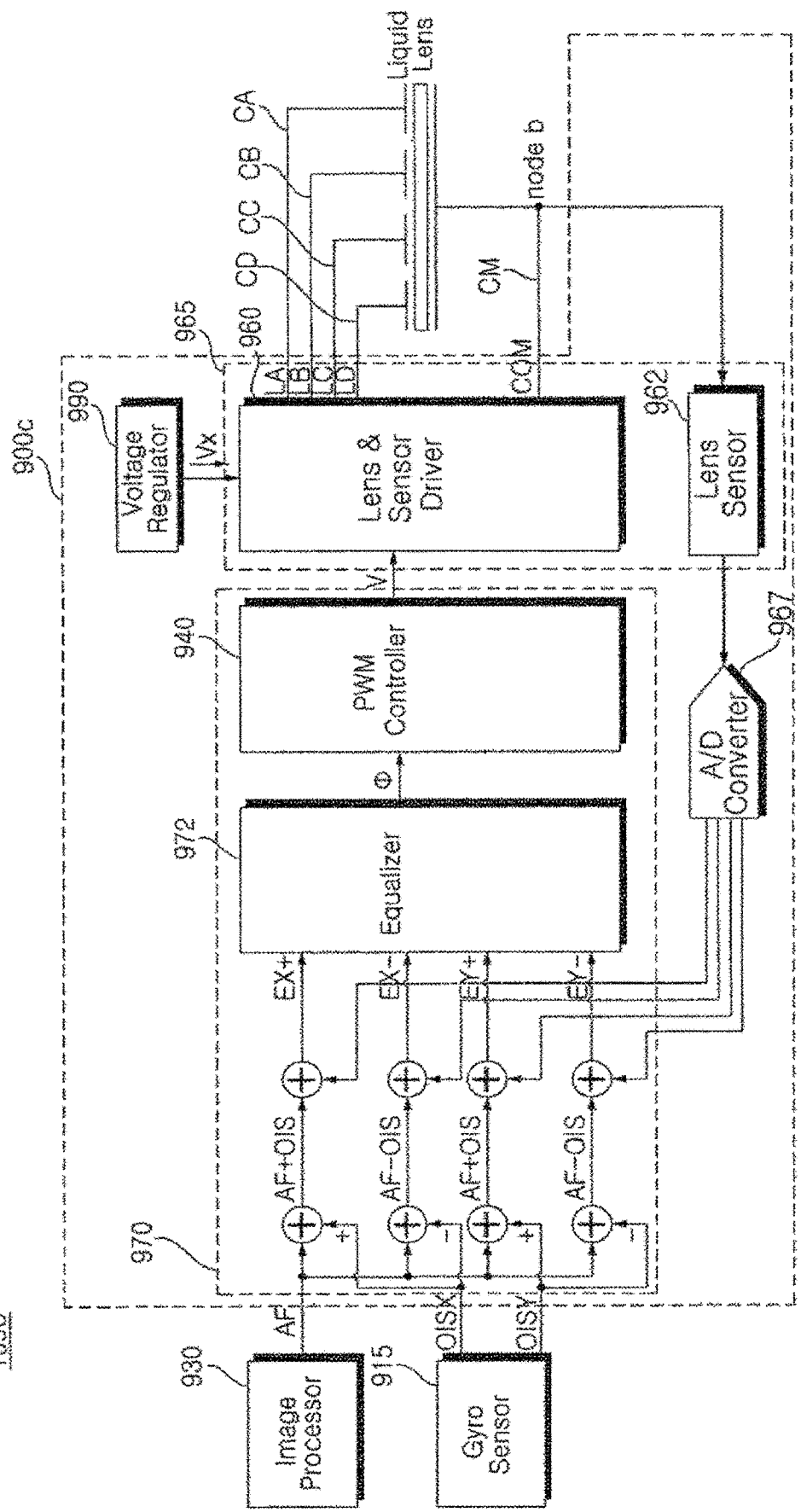
FIG. 15B is an exemplary internal block diagram of a camera according to yet another embodiment of the present invention.

FIG. 15B is an exemplary internal block diagram of a camera according to yet another embodiment of the present invention.

Referring to FIG. 15B, the camera 195o and the lens curvature variation apparatus 900c of FIG. 15B are similar to the camera 195m and the lens curvature variation apparatus 900 of FIG. 7, except that the sensor unit 962 senses the capacitance of an end of a liquid corresponding to the plurality of electrodes (LA to LD) 540a to 540d.

To this end, a low-level voltage may be applied to the plurality of electrodes (LA to LD) 540a to 540d, and a pulse signal may be applied to the common electrode (COM).

As described above with reference to FIG. 7, the lens driver 960 includes a detection element Rsens connected to one end of the switching element S'a or S'b.

At time T4 or T8 when the switching element S'a or S'b is turned on, the sensor unit 962 senses an electrical signal detected by the detection element Rsens.

Thus, the sensor unit 962 may sense a capacitance for the boundary region between the insulator on the electrodes and the electroconductive aqueous solution and transmit the same to the controller 970.

Thereby, the capacitance for the boundary regions of the liquid lens 500 may be sensed.

Further, since the camera 195o of FIG. 15B can form an asymmetric curvature in response to tremor correction, tremor correction may be performed accurately and quickly.

In particular, the gyro sensor 915 may output x-axis tremor information OISx and y-axis tremor information OISy. The x-axis tremor information OISx and the y-axis tremor information OISy are input to the controller 970.

The control unit 970 may set a target curvature based on the focus information AF about an image from the image processor 930.

The controller 970 may set a target x-axis tilt based on the x-axis tremor information OISx and set a target y-axis tilt based on the y-axis tremor information OISy.

The controller 970 may feed back the signal sensed by the sensor unit 960 to form the target curvature.

The controller 970 may feed back the signal sensed by the sensor unit 960 to form the target x-axis tilt and the target y-axis tilt.

The lens curvature variation apparatus 900 described with reference to FIGS. 9 to 15B may be employed for various electronic devices such as the mobile terminal, a vehicle, a TV, a drone, a robot, and a robot cleaner.

The method of operating the lens curvature variation apparatus of the present invention may be implemented as code that can be read by a processor on a recording medium readable by a processor included in the lens curvature variation apparatus. The processor-readable recording medium may include all kinds of recording apparatuses in which data readable by the processor is stored. Examples of the recording medium readable by the processor include a ROM, a RAM, a CD-ROM, a magnetic tape, a floppy disk, and an optical data storage device, and may also be implemented in the form of a carrier wave such as transmission over the Internet. In addition, the processor-readable recording medium may be distributed over network-connected computer systems such that code readable by the processor in a distributed fashion may be stored and executed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to a lens curvature variation apparatus capable of quickly and accurately sensing the curvature of a lens.

The invention claimed is:

1. A lens curvature variation apparatus for varying a curvature of a liquid lens that is variable based on an applied first electrical signal, the lens curvature variation apparatus comprising:
   a lens driver to apply the first electrical signal to the liquid lens;
   a sensor unit to sense the curvature of the liquid lens formed based on the first electrical signal; and
   a controller to control the lens driver to form a target curvature of the liquid lens based on the sensed curvature,
   wherein the lens driver supplies the first electrical signal to the liquid lens according to a switching operation of a switching element, and comprises a detection element connected to one end of the switching element, wherein the sensor unit senses a second electrical signal detected by the detection element, and
wherein the controller comprises:
an equalizer to calculate a curvature error based on the calculated curvature and the target curvature; and
a pulse width variation controller to generate and output the pulse width variation signal based on the calculated curvature error.

2. A lens curvature variation apparatus for varying a curvature of a liquid lens that is variable based on an applied first electrical signal, the lens curvature variation apparatus comprising:
a lens driver to apply the first electrical signal to the liquid lens;
a sensor unit to sense the curvature of the liquid lens formed based on the first electrical signal; and
a controller to control the lens driver to form a target curvature of the liquid lens based on the sensed curvature,
wherein the lens driver supplies the first electrical signal to the liquid lens according to a switching operation of a switching element, and comprises a detection element connected to one end of the switching element,
wherein the sensor unit senses a second electrical signal detected by the detection element,
wherein the lens driver comprises:
a first upper switching element and a first lower switching element connected in series to each other; and
a second upper switching element and a second lower switching element connected in parallel to the first upper and lower switching elements and connected in series to each other, and
wherein the detection element is connected between a ground terminal and one of the first lower switching element and the second lower switching element.

3. The lens curvature variation apparatus according to claim 1, wherein the sensor unit senses an area of a boundary region between an insulator on an electrode and an electroconductive aqueous solution in the liquid lens or a change in the area based on the second electrical signal detected by the detection element.

4. A lens curvature variation apparatus for varying a curvature of a liquid lens that is variable based on an applied first electrical signal, the lens curvature variation apparatus comprising:
a lens driver to apply the first electrical signal to the liquid lens;
a sensor unit to sense the curvature of the liquid lens formed based on the first electrical signal; and
a controller to control the lens driver to form a target curvature of the liquid lens based on the sensed curvature,
wherein the lens driver supplies the first electrical signal to the liquid lens according to a switching operation of a switching element, and comprises a detection element connected to one end of the switching element,
wherein the sensor unit senses a second electrical signal detected by the detection element,
wherein the liquid lens comprises:
a common electrode;
a plurality of electrodes spaced apart from the common electrode; and
a liquid and an electroconductive aqueous solution, the liquid and the electroconductive aqueous solution being disposed between the common electrode and the plurality of electrodes, and wherein the sensor unit senses the second electrical signal detected by the detection element while a level of a pulse applied to the common electrode or a first electrode of the plurality of electrodes is varied.

5. The lens curvature variation apparatus according to claim 4, wherein the sensor unit comprises:
an integrator to sum levels of the second electrical signal detected by the detection element while the level of the pulse applied to the common electrode or the first electrode of the plurality of electrodes is varied; and
an amplifier to amplify the second electrical signal summed by the integrator.

6. The lens curvature variation apparatus according to claim 5, wherein a sum value of the levels of the second electrical signal obtained while the level of the pulse applied to the common electrode or the first electrode of the plurality of electrodes is varied is varied depending on an area of a boundary region between an insulator on the electrodes and the electroconductive aqueous solution in the liquid lens or a change in the area.

7. The lens curvature variation apparatus according to claim 5, wherein an output value of the integrator increases as a time difference between a first pulse applied to the common electrode and a second pulse applied to the first electrode among the plurality of electrodes increases.

8. The lens curvature variation apparatus according to claim 4, wherein the sensor unit comprises:
a zero-crossing detector to detect zero-crossing of the second electrical signal detected by the detection element while the level of the pulse applied to the common electrode or the first electrode of the plurality of electrodes is varied.

9. The lens curvature variation apparatus according to claim 8, comprising:
a first converter to convert an output value of the zero-crossing detector into a digital signal,
wherein the output value of the converter increases as a time difference between a first pulse applied to the common electrode and a second pulse applied to the first electrode among the plurality of electrodes increases.

10. The lens curvature variation apparatus according to claim 1, comprising:
a second converter to convert an output signal output from the sensor unit into a digital signal.

11. The lens curvature variation apparatus according to claim 5, wherein the curvature of the liquid lens increases as an area of a boundary region between an insulator on the electrodes and the electroconductive aqueous solution in the liquid lens or a change in the area increases.

12. The lens curvature variation apparatus according to claim 4, wherein, when different voltages are applied to a first electrode and a second electrode among the plurality of electrodes, a first capacitance of a first end portion of the liquid is different from a second capacitance of a second end portion of the liquid.

13. The lens curvature variation apparatus according to claim 4, wherein the curvature of the liquid lens increases as a time difference between a first pulse applied to the common electrode and a second pulse applied to one of the plurality of electrodes increases.

14. The lens curvature variation apparatus according to claim 4, wherein, while a pulse is applied to the common electrode and at least one of the plurality of electrodes, the controller calculates the curvature of the liquid lens based on a capacitance sensed by the sensor unit, and outputs a pulse width variation signal to the lens driver based on the calculated curvature and the target curvature, wherein, when the calculated curvature is less than the target curvature, the controller controls a duty of the pulse width variation signal to increase.

15. The lens curvature variation apparatus according to claim 14, wherein the controller comprises:

an equalizer to calculate a curvature error based on the calculated curvature and the target curvature; and a pulse width variation controller to generate and output the pulse width variation signal based on the calculated curvature error.

\* \* \* \* \*